(12) United States Patent
Ivarsson et al.

(10) Patent No.: US 12,436,930 B1
(45) Date of Patent: Oct. 7, 2025

(54) DATABASE MANAGEMENT TECHNIQUES WITH CONTROLLING DOCUMENTS

(71) Applicant: SAP SE, Walldorf (DE)

(72) Inventors: Erica Emelie Ivarsson, Berlin (DE); Tushara Devi Bhogadi Ravishankar, Kaiserslautern (DE); Niklas Weidenfeller, Mannheim (DE); Millie Lou, Vancouver (CA); Yingying Cao, Karlsruhe (DE); Marie-Luise Wagener-Kirchner, Hemsbach (DE); Paul Petraschk, Vetschau/Spreewald (DE); Kartikaye Gomber, Chester Springs, PA (US); Cornelius Bock, Berlin (DE); Abhishek V Tatachar, Bangalore (IN); Dinh Gia Bao Dang, Philadelphia, PA (US); Angelo Scherthan, Philippsburg (DE)

(73) Assignee: SAP SE, Walldorf (DE)

( * ) Notice: Subject to any disclaimer, the term of this patent is extended or adjusted under 35 U.S.C. 154(b) by 29 days.

(21) Appl. No.: 18/677,661

(22) Filed: May 29, 2024

(51) Int. Cl.
*G06F 16/00* (2019.01)
*G06F 16/21* (2019.01)
*G06F 16/23* (2019.01)
*G06F 16/28* (2019.01)
*G06F 16/93* (2019.01)

(52) U.S. Cl.
CPC ........ *G06F 16/217* (2019.01); *G06F 16/2379* (2019.01); *G06F 16/284* (2019.01); *G06F 16/93* (2019.01)

(58) Field of Classification Search
CPC .. G06F 16/217; G06F 16/2379; G06F 16/284; G06F 16/93
See application file for complete search history.

(56) References Cited

U.S. PATENT DOCUMENTS

| | | | |
|---|---|---|---|
| 8,209,278 B1 | 6/2012 | Straus | |
| 8,370,272 B2* | 2/2013 | Wickel | G06Q 10/0875 705/342 |
| 8,914,309 B2* | 12/2014 | Pham | H04L 63/102 705/50 |
| 10,445,571 B1* | 10/2019 | Gaeta | G06F 3/04842 |
| 10,698,938 B2* | 6/2020 | Miracolo | G06F 16/93 |

(Continued)

OTHER PUBLICATIONS

Metricstream, "What is Regulatory Change Management?," downloaded from https://www.metricstream.com/learn/what-is-regulatory-change-management.html on Aug. 11, 2025, also available on Wayback Machine, pp. 1-6.

(Continued)

*Primary Examiner* — Noosha Arjomandi
(74) *Attorney, Agent, or Firm* — Klarquist Sparkman, LLP

(57) ABSTRACT

Methods and systems are disclosed for database management with controlling documents. Tasks addressed include: identification of requirements in the documents, tracking changes as documents evolve, mapping documents or requirements to database entries, identifying gaps between documents and the database, and proposing database updates. Disclosed embodiments address these tasks using a combination of sequential program logic, machine-learning tools, and client interaction. Workflows address one or more tasks. Examples pertaining to regulatory documents are presented. Variations are disclosed.

20 Claims, 20 Drawing Sheets

(56) References Cited

U.S. PATENT DOCUMENTS

| | | | |
|---|---|---|---|
| 11,615,637 B1* | 3/2023 | Gaeta | G06N 20/00 |
| | | | 715/233 |
| 11,630,881 B2 | 4/2023 | Greven et al. | |
| 11,971,889 B2* | 4/2024 | Won | G06F 16/24539 |
| 2010/0079781 A1* | 4/2010 | Yamamoto | H04N 1/2179 |
| | | | 358/1.15 |
| 2010/0268740 A1* | 10/2010 | Barker | G06F 16/93 |
| | | | 707/783 |
| 2011/0246391 A1* | 10/2011 | Henderson | G06Q 40/04 |
| | | | 705/36 R |
| 2013/0090977 A1 | 4/2013 | Zeng et al. | |
| 2014/0032633 A1* | 1/2014 | Kleppner | G06F 40/169 |
| | | | 709/202 |
| 2014/0033013 A1* | 1/2014 | Shaver | G06F 40/166 |
| | | | 715/255 |
| 2014/0149857 A1* | 5/2014 | Vagell | G06F 40/169 |
| | | | 715/255 |
| 2014/0280070 A1* | 9/2014 | George | G06F 16/93 |
| | | | 707/722 |
| 2014/0372370 A1 | 12/2014 | Massand | |
| 2017/0103230 A1* | 4/2017 | O'Brien | G06Q 10/10 |
| 2020/0111023 A1 | 4/2020 | Pondicherry Murugappan et al. | |
| 2020/0151279 A1* | 5/2020 | Haberstroh | G06F 8/38 |
| 2020/0349130 A1* | 11/2020 | Bracholdt | G06F 16/254 |
| 2021/0357392 A1 | 11/2021 | Bulut et al. | |
| 2022/0083520 A1* | 3/2022 | Malamut | G06F 16/278 |
| 2022/0171965 A1* | 6/2022 | Kumar | G06N 5/04 |
| 2022/0309037 A1 | 9/2022 | Gutierrez et al. | |
| 2023/0111877 A1 | 4/2023 | Toebben | |
| 2023/0306134 A1 | 9/2023 | Milind et al. | |
| 2023/0334025 A1 | 10/2023 | Halko | |
| 2024/0330605 A1* | 10/2024 | Hunn | H04L 9/3247 |
| 2025/0254036 A1* | 8/2025 | Sitrick | H04L 9/0861 |

OTHER PUBLICATIONS

Ravindranathan, "Regulatory Change Manager: Your Solution to Navigate Regulatory Changes with Ease," available from https://community.sap.com/t5/enterprise-resource-planning-blogs-by-sap/regulatory-change-manager-your-solution-to-navigate-regulatory-changes-with/ba-p/13616314, 8 pages (Feb. 2024).

Ravindranathan, Screenshot from https://dam.sap.com/mac/app/e/video/embed/EV81yCn?ltr=a&rc=10&includeSapBrandedWraper=true&includeRelatedAssets=true at 18:58, 1 page (Mar. 2024).

SAP, "Process Control," downloaded Mar. 17, 2024, from https://www.sap.com/products/financial-management/internal-control.html, pp. 1-10.

SAP, "What is governance, risk, and compliance (GRC)?" downloaded Mar. 17, 2024 from https://www.sap.com/products/financial-management/what-is-grc.html, pp. 1-6.

* cited by examiner

Security and Privacy Controls for Information Systems and Organizations

311 — NIST Special Publication 800-53 Revision 5

JOINT TASK FORCE

This publication is available free of charge from:
https://doi.org/10.6028/NIST.SP.800-53r5

NIST
National Institute of Standards and Technology
U.S. Department of Commerce

NIST SP 800-53 Rev. 5, Security and Privacy Controls for Information Systems and Organizations
- Abstract
- Keywords
- Errata
- INTRODUCTION
- THE FUNDAMENTALS
- THE CONTROLS
  - 3.1 ACCESS CONTROL — 323
    - AC-1 POLICY AND PROCEDURES
    - AC-2 ACCOUNT MANAGEMENT
    - AC-3 ACCESS ENFORCEMENT
    - AC-4 INFORMATION FLOW ENFORCEMENT
    - AC-5 SEPARATION OF DUTIES
    - ...
    - AC-17 REMOTE ACCESS
    - AC-18 WIRELESS ACCESS
    - AC-19 ACCESS CONTROL FOR MOBILE DEVICES
    - AC-20 USE OF EXTERNAL SYSTEMS
    - 321 — AC-21 INFORMATION SHARING — 322
    - AC-22 PUBLICLY ACCESSIBLE CONTENT

AC-21 INFORMATION SHARING

331 Control: ⌐332

333 a. Enable authorized users to determine whether access authorizations assigned to a sharing partner match the information's access and use restrictions for [Assignment: organization-defined information sharing circumstances where user discretion is required]; and 334 b. Employ [Assignment: organization-defined automated mechanisms or manual processes] to assist users in making information sharing and collaboration decisions.

Discussion: Information sharing applies to information that may be restricted in some manner based on some formal or administrative determination. Examples of such information include, contract-sensitive information, classified information related to special access programs or compartments, privileged information, proprietary information, and personally identifiable information. Security and privacy risk assessments as well as applicable laws, regulations, and policies can provide useful inputs to these determinations. Depending on the circumstances, sharing partners may be defined at the individual, group, or organizational level. Information may be defined by content, type, security category, or special access program or compartment. Access restrictions may include non-disclosure agreements (NDA). Information flow techniques and security attributes may be used to provide automated assistance to users making sharing and collaboration decisions.

335

Related Controls: AC-3, AC-4, AC-16, PT-2, PT-7, RA-3, SC-15.

Control Enhancements: 336

337 (1) INFORMATION SHARING | AUTOMATED DECISION SUPPORT
Employ [Assignment: organization-defined automated mechanisms] to enforce information-sharing decisions by authorized users based on access authorizations of sharing partners and access restrictions on information to be shared.
Discussion: Automated mechanisms are used to enforce information sharing decisions.
339 Related Controls: None.

338 (2) INFORMATION SHARING | INFORMATION SEARCH AND RETRIEVAL ⌐340
Implement information search and retrieval services that enforce [Assignment: organization-defined information sharing restrictions].
Discussion: Information search and retrieval services identify information system resources relevant to an information need.

Related Controls: None.

341 References: [OMB A-130], [SP 800-150], [IR 8062].

AC-22 PUBLICLY ACCESSIBLE CONTENT

*FIG. 3C*

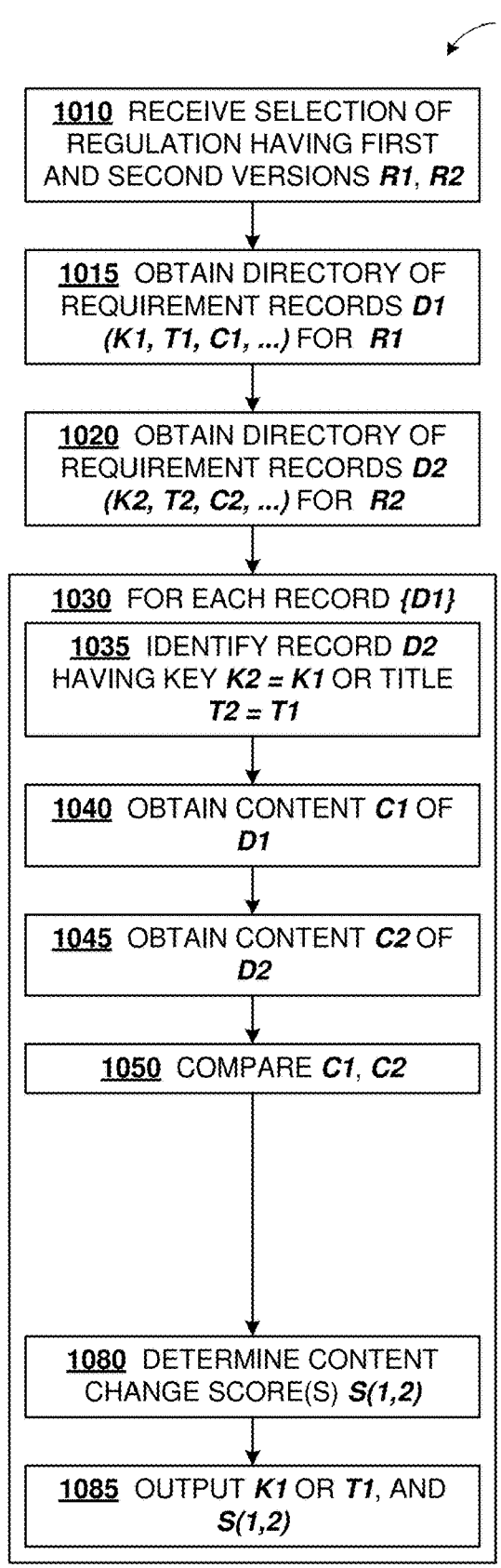
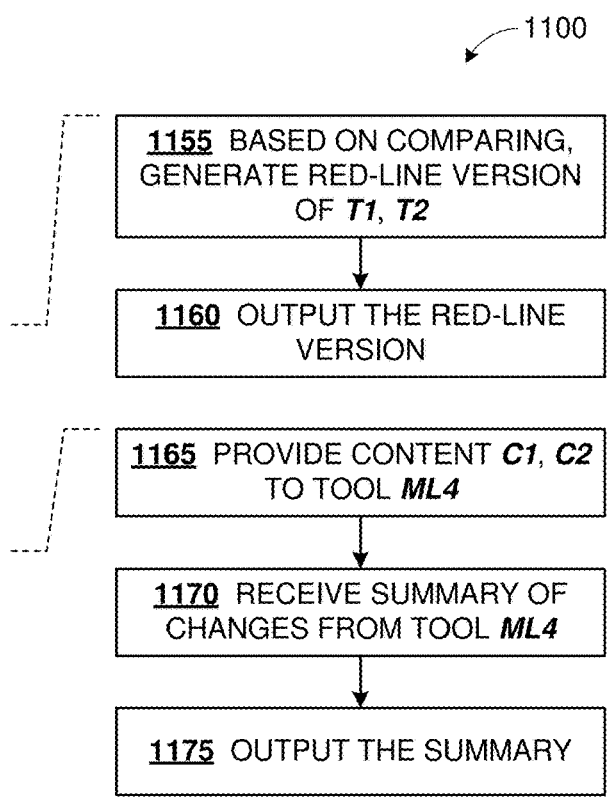
FIG. 10
FIG. 11

| | 1211 | 1212 | 1213 | 1214 |
|---|---|---|---|---|
| 1220 | KEY | TITLE | CONTENT CHANGE | SELECT |
| 1221 | AC-1 | POLICY AND PROCEDURES | 69% | ■ |
| 1222 | AC-2 | IDENTIFIER MANAGEMENT | 42% | ☐ |
| 1223 | AC-3 | ACCOUNT MANAGEMENT | 20% | ☐ |

FIG. 12A — 1201

| KEY | RED-LINE COMPARISON |
|---|---|
| AC-1 | AC-1 ~~ACCESS CONTROL~~ POLICY AND PROCEDURES |

1226

Control: ~~The organization: a. Develops, documents~~ Develop, document, and ~~disseminates~~ disseminate to [Assignment: organization-defined personnel or roles]: 1. ~~An~~ [Selection (one or more): Organization-level; Mission/business process-level; System-level] access control policy that: (a) Addresses purpose, scope, roles, responsibilities, management commitment, coordination among organizational entities, and compliance; and ~~and~~ (b) Is consistent with applicable laws, executive orders, directives, regulations, policies, standards, and guidelines; and 2. Procedures to facilitate the implementation of the access control policy and the associated access controls; ~~and b. Reviews and updates~~ b. Designate an [Assignment: organization-defined official] to manage the development, documentation, and dissemination of the access control policy and procedures; and c. Review and update the current access control: 1. ~~Access control~~ Policy [Assignment: organization-defined frequency]~~;~~ and following [Assignment: organization-defined events]; and 2. ~~Access control~~ Procedures [Assignment: organization-defined frequency]~~;~~ and following [Assignment: Supplemental Guidance: This control ~~addresses the establishment of~~ policy and procedures ~~for the~~ address the controls in the AC family that are ~~effective implementation of selected~~ implemented within systems and organizations. The

FIG. 12B — 1202

| KEY | SUMMARY |
|---|---|
| AC-1 | V5 includes a more detailed breakdown of the risk assessment process. V5 introduces the concept of privacy risk assessment. V5 includes additional related controls. V5 introduces control enhancements related to supply chain risk, all-source intelligence, dynamic threat awareness, and predictive cyber analytics. |

| CLASSIFICA-TION L2 (R2 RELATIVE TO R3) | CLASSIFICATION L1 (R1 RELATIVE TO R2) | | | D2 DELETED |
|---|---|---|---|---|
| | D1 NEW | UPDATED | UNCHANGED | |
| D2 NEW | | 7 | 4 | 1 |
| UPDATED | | 12 | 9 | 3 |
| UNCHANGED | | 1 | 17 | 1 |
| TOTALS | 10 | 20 | 30 | 5 |

| CLASS | % FEATURES |
|---|---|
| COVERED | 82% |
| MOSTLY COVERED | 12% |
| WEAKLY COVERED | 6% |

| | 2011 FEATURE F | 2012 COVERAGE C | 2013 CLASSIFICATION L |
|---|---|---|---|
| 2020 → | FEATURE F | COVERAGE C | CLASSIFICATION L |
| 2021 → | AC-21 | 28% | WEAKLY COVERED |
| 2022 → | AC-21#01 | 85% | MOSTLY COVERED |
| 2023 → | "Security and privacy risk assessments" | 100% | COVERED |

| FEATURE |
|---|
| AC-1 |

2031 ↗
2033 ↘

| CLASS |
|---|
| MOSTLY COVERED |

| 2032 OPTIMAL COVERAGE | |
|---|---|
| ENTRY | COVERAGE |
| E1 | 60% |
| E2 | 40% |
| OVERALL C' | 90% |

DATABASE MANAGEMENT TECHNIQUES WITH CONTROLLING DOCUMENTS

BACKGROUND

Database applications are often required to function alongside other documents, with varying relationships between the database and the documents. In varying examples, a database can contain data extracted from a document, a document can contain content extracted from a database, or certain database data can be related to certain document content. As an illustration, a specification document can control a database. Moreover, a single database can be associated with multiple documents, or multiple databases can be associated with a single document. In any of these scenarios, both document and database can evolve, and it can be challenging to maintain desired relationships. Because document formats can and do vary widely, maintaining relationships between documents and databases often requires a great deal of manual effort. Accordingly there remains a need for improved technologies to track relationships between databases and associated documents, including in scenarios where a database is controlled by one or more documents.

SUMMARY

Examples of the disclosed technologies provide techniques and workflows to assist with database management controlled by external documents. Tasks addressed include identification of requirements in the documents, tracking changes as documents evolve, mapping regulations or requirements to database entries, identifying gaps between documents and the database, and proposing database updates to maintain compliance. Disclosed workflows address single tasks or combinations. A mix of sequential program logic, machine-learning tools, and client guidance is employed. Although some disclosed examples are described in context of regulations, the disclosed technologies are not so limited.

The foregoing and other objects, features, and advantages of the invention will become more apparent from the following detailed description, which proceeds with reference to the accompanying figures.

BRIEF DESCRIPTION OF THE DRAWINGS

FIGS. 3A-3C are excerpts from an example regulation to which disclosed technologies can be applied.

FIG. 10 is a flowchart illustrating an example method for delta analysis of controls according to the disclosed technologies.

FIG. 11 is a flowchart illustrating variations and extensions of the method of FIG. 10, according the disclosed technologies.

FIGS. 12A-12C show example output from the method of FIG. 10.

FIGS. 20A-20C show example output from the method of FIG. 19.

DETAILED DESCRIPTION

Introduction

Figure 1:
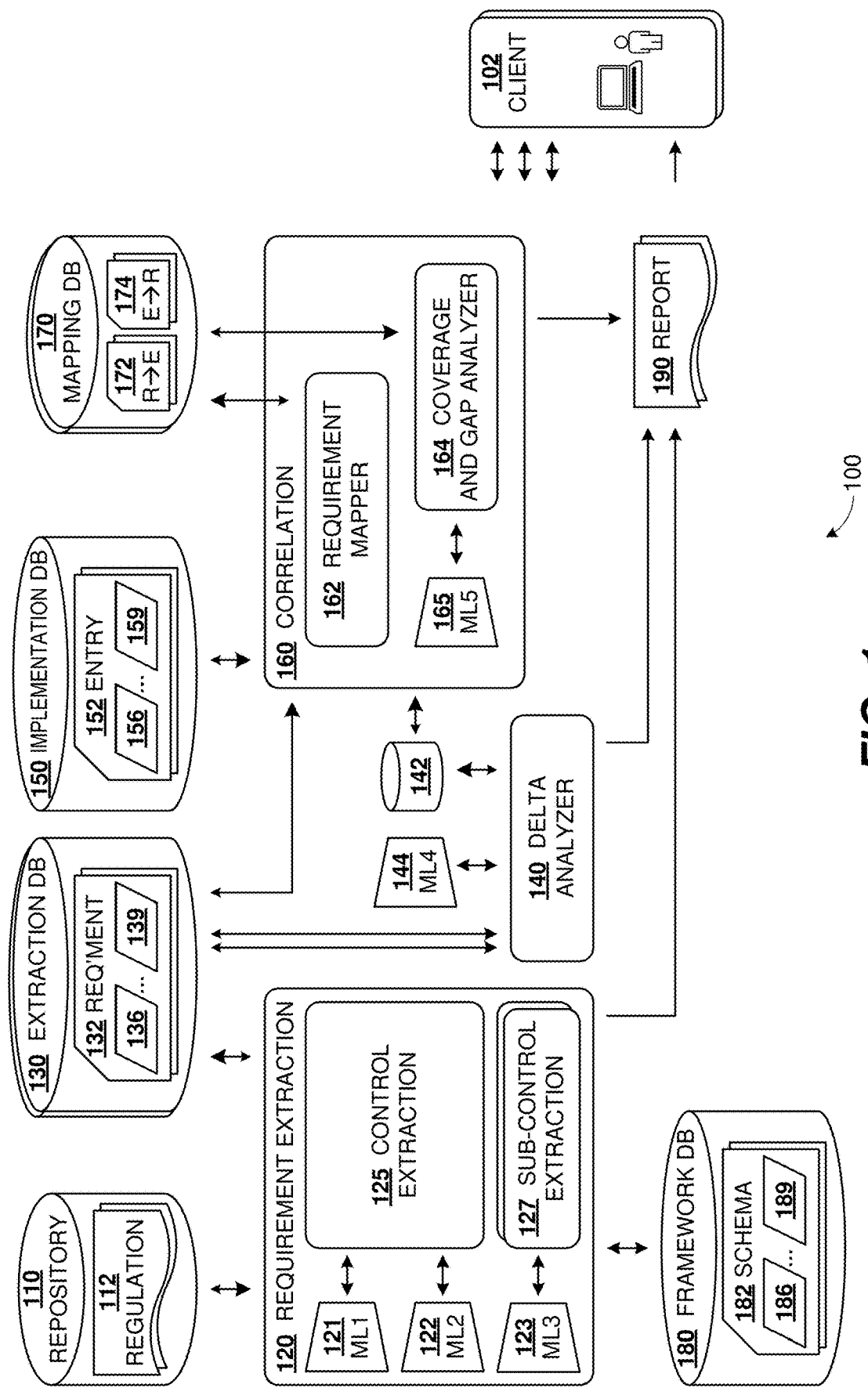
FIG. 1 is a hybrid diagram illustrating an example deployment of disclosed technologies.

Regulatory compliance is one area where documents and databases intersect. An organization can be required to demonstrate compliance with many regulatory documents ("regulations"). These regulations can be published by governmental entities, standards bodies, trade associations, international alliances, or internal authorities. Regulations can overlap in scope, can change over time, and are often not harmonized.

In order to demonstrate compliance, the organization can maintain a database of various aspects of its activities and processes intended to provide compliance with one regulation or another. As an illustration, a safety regulation may require that bolts in a particular application be Grade 8, and the organization can create a database entry linked to its procurement specification indicating that bolts purchased for that application are indeed Grade 8.

One case study found that a single multinational organization was subject to 1217 regulations, which generated on average 257 regulatory change events each day. Maintaining compliance in such an environment requires an enormous amount of effort by highly trained personnel, and is error-prone. Moreover, compliance is often siloed within departments, each maintaining its own expertise, and these departments may sometimes act in conflicting ways.

The disclosed technologies do not seek to eliminate trained personnel entirely, but rather to apply innovative technical approaches to reduce labor required to develop understanding and reach decisions. In particular, the disclosed technologies attempt to address the following tasks:

(A) Digest regulations into their constituent parts, dubbed "controls" and "sub-controls," or collectively "requirements;"
(B) Identify changes between old and new versions of requirements or regulations;
(C) Map regulations or requirements to the organization's database ("implementation database");
(D) Identify gaps between the regulation and the implementation database;
(E) Propose updates to the implementation database.

Each of these tasks can be performed independently, or combinations of two or more tasks can be integrated into various workflows. To illustrate, tasks (A) and (C) together can help answer the question: where in the implementation database do we support this regulation? Tasks (B) and (D) together can help answer the question: what is the impact of the updated regulation? Tasks (D) and (E) together—or (C), (D), and (E)—can help answer the question: what do we need to do to achieve compliance with this regulation?

In order to accomplish these tasks, the disclosed technologies apply a mix of technologies including sequential program logic, off-the-shelf trained ML tools, and new fine-tuned ML tools. These ML tools can be, but are not limited to, large language models (LLM). In some aspects, a "human-in-the-loop AI" paradigm can be used.

In particular, the disclosed technologies facilitate management of the implementation database according to the regulations.

While the disclosed technologies are presented in context of regulatory compliance, they are not so limited. Rather, at least portions of the disclosed technologies can be applied to many applications where some conformance between documents and databases is required.

Example Regulation

FIGS. 3A-3C are excerpts 301-303 from an example regulation. This document, titled "Security and Privacy Controls for Information Systems and Organizations," is publication 800-53 Rev. 5 of the National Institute of Standards and Technology, Gaithersburg MD. FIG. 3A shows the front page, on which publisher 311, document number, and title are identifiable. FIG. 3B is an excerpt 302 of the table of contents, and FIG. 3C is an excerpt 303 showing a section AC-21 which, as described further herein, is a "control" containing "sub-controls" 337-338. Other features of FIGS. 3A-3C are described further in context of various examples.

Terminology

"Augmentation" refers to attributes of text in a document which can convey information beyond what the text itself conveys. Non-limiting examples of such attributes include: text position (e.g. position on page, indentation, justification), text style (e.g. font name, font size, font style—e.g. bold, underline, or italics-foreground color, background color). A document that includes augmentation can be described as being in "augmented form." A document lacking augmentation, e.g. a plaintext version, is not in augmented form. Some examples of the disclosed technologies can make use of discontinuities in augmentation to identify a beginning or end of a requirement or field thereof. To illustrate, end of content can sometimes be detected by an increase in font size, a decrease in left indent, or a change from normal font style to boldface.

"Classify" and "classification" refer to an act of assigning an item to one or more of a finite predetermined set of choices. In some examples of interest herein, the classified item can be a requirement of a regulation, which can be classified based on changes relative to the same requirement in another version of the regulation, or based on coverage in an implementation database. In some examples, classification can be performed by a trained machine learning tool. A software program performing classification is termed a "classifier". A class assigned to training data is dubbed a "label."

A "client" is a hardware or software computing entity that uses a resource provided by another hardware or software computing entity. A "client interface" is a software component which receives input from or provides output to a client.

"Coverage" (or "coverage score") refers to a degree of match between two data entities, such as a requirement from a regulation and an entry in an implementation database. To illustrate, if a requirement has 10 keywords, 8 of which are found in a given entry, that entry can be said to provide 80% coverage of the requirement. In varying examples, coverage can be calculated at different levels of granularity (e.g. document, requirement, or a text fragment thereof, sometimes denoted generically as features) and can be calculated using different procedures (e.g. keyword-based or semantic-based). Coverage can be 1-to-1, e.g. a coverage of one requirement by one entry, or 1-to-many, e.g. four entries collectively providing 97% coverage of a given feature. Coverage can be classified. In some examples, binary classification can be used, e.g. a given feature is Covered or Not Covered. In other examples, three or more classifications can be used. To illustrate, "Covered" can indicate 100% coverage; "Potentially covered" or "Mostly covered" can indicate coverage above a first threshold (e.g. between 30% and 80%) but below a second threshold (e.g. 100%); and "Uncovered" or "Weakly Covered" can indicate coverage below the first threshold, including 0% coverage.

A "criterion" is a condition or basis for making a categorical determination. In examples, one or more criteria can be used to discern keys, titles, or content of one or more requirements.

The unqualified term "data" refers to any digital representation of information.

A "database" is an organized collection of data maintained on computer-readable media and accessible by execution of instructions at one or more processors. Databases can be relational, in-memory or on disk, hierarchical or non-hierarchical, or any other type of database. Some databases of interest in this disclosure are organized as "records," each record being a collection of fields having respective values. The fields of two records can be the same, while the corresponding values can be the same or can vary between records. In some examples, records can be organized as rows of a table, with like fields of the records forming a corresponding column of the data table. In varying examples, the specific organization of the table can differ, e.g. rows and columns can be swapped, or the table can be organized as a multi-dimensional array. Regardless of the physical or logical organization of the records or table, a "row" denotes one record, and a "column" denotes a collection of like fields (which can have varied values) over a collection of one or more records. Some databases of interest herein include: a repository storing regulations; an extraction database storing records of respective requirements, such as requirements extracted from a regulation; an implementation database storing records (dubbed "entries") describing an organization's implementation of items that may fall within purview of a regulation; a mapping database storing correspondence between requirement records and entries in an implementation database; a delta database storing analysis results related to version changes of regulations; or a framework database, storing schemas for processing respective requirement or document types. An "update" to a database can include one or more of: an addition of a record to the database, a modification of a record already in the database, or a deletion a record from the database.

An "endpoint" is a position in a document where a requirement or component thereof terminates. A "termination criterion" is a criterion which can be used to identify the endpoint. As described herein, some examples of the disclosed technologies can use discontinuities in augmentation to detect endpoints.

A "formula" is a prescription for identifying a pattern. In some examples, a regular expression ("regexp") can be used as a formula, but this is not a requirement. Other formulas can specify augmentation. Formulas can be in the form of a pattern specification or a software function for detecting an occurrence of such a pattern.

A "graphical user interface" ("GUI") is an interface on which a software program can visually display data or other objects to a user, combined with one or more input devices via which the user can provide input to the software program responsive to the visual display.

The term "knowledge domain" refers to one or more subject areas of interest in a deployment of the disclosed technologies. The subject areas can be related to each other (e.g. fasteners and tools), but this is not a requirement. In some examples, two disparate subject areas can be of interest to an organization. Knowledge or data of the knowledge domain can be represented as a "knowledge model," which can be a graphical representation, e.g. in a multi-dimensional space in which vector representations of knowledge tokens are defined.

A "large language model" ("LLM") is an implementation of a machine-learning technique incorporating an attention mechanism. The term large is a reflection of usage in the art; it does not imply any specific size, and is not a term of degree. Thus, many LLMs include billions or even over a trillion trained parameters, but this is not a requirement.

A "locator" of a data object is a pointer or reference to that object. A locator can be a reference to unstructured data, e.g. at a memory location or stored as a disk file, or to structured data, e.g. an index value of a record. In some disclosed examples, a requirement record can contain a field for a (compact) locator of the requirement's content rather than the possibly bulky content itself.

"Machine learning" (or "ML") denotes a technique for improving performance of a software tool through experience (dubbed "training"), and that tool is dubbed a "machine-learning tool." Examples of machine learning tools are able to learn and adapt without following explicit instructions, by using algorithms and statistical models to analyse and draw inferences from patterns in data. The qualifier "trained," as an adjective, indicates that an ML tool has undergone training to attain performance at least equal to a predetermined threshold. Training can be performed in a "training phase," in which training data (for which desired outputs are known) is applied at the input to the tool, and deviations between the tool output and the desired output are used to adjust parameter values within the ML tool, e.g. by back-propagation. After being trained, the ML tool can be fed fresh data and its outputs can be used as needed. This phase is sometimes termed an "inference phase." A neural network is an example of a software tool that can be trained by machine learning. Some examples described herein use existing ML tools such as LayoutLM or GPT4 directly, or as a basis for further customization.

The term "match" variously refers to two data items that are identical, or to a pattern in a document which satisfies a formula. In such usage, a match is a binary-valued attribute. However, in other usage, a "matching score" indicates a degree to which two entities are similar.

A "neural network" is an artificial network of "units" (or "cells") that has linkages modeled on behavior of biological neurons and that can be implemented by a software program on a computer. A neural network is an example of a machine learning tool. Some neural networks described herein can be "transformer neural networks" (or simply "transformers") which have couplings between cells independent of the spacing between the cells. Other neural networks described herein can be "convolutional neural networks" (or "CNN"s) which are multi-layer neural networks incorporating at least one convolutional layer, the connectivity and parameters of which apply a convolution operation uniformly across cells of a preceding layer to obtain the instant layer.

A "program" is a structured collection of computer-executable instructions, in source code, object code, or executable forms. A program can be organized as one or more modules. Multiple programs or modules can be organized in a "library." A program commonly operates on some input data (e.g. a regulation, a database, or client input) and produces some output data (e.g. database records, analysis results, or visualizations). This input and output data is generally not part of the program, but a program can include configuration or other data to guide operation of the program.

As a noun, a "rank" is an ordinal position (e.g. 1, 2, 3, . . . ) in an ordering of data items or other entities, As commonly used, a high rank corresponds to a small number, rank 1 being the highest rank, and large numbers correspond to low ranks. An "offsetted rank" is a rank with an offset applied, e.g.; ranks begin "61, 62, 63, . . . " instead of "1, 2, 3, . . . " Offsetted ranks can offer advantages in certain numerical calculations using ranks, as described herein. As a verb, "rank" refers to an act of assigning ranks to data items or other entities.

The term "receive" refers to an act of getting information at a software program from another software program, a database, a client, or a communication port. Similarly, the term "transmit" refers to an act of conveying information from a software program to another software program, a database, a client, or a communication port. In varying examples, receiving or transmitting can be performed by communication over a bus or network, by message passing (including parameter passing between software modules, e.g. on a call stack), by use of a shared memory location, or by another technique.

"Red-line" refers to a joint presentation of two similar text objects showing changes between the text objects. In some examples, in a comparison of a newer text object (e.g. "apple banana cherry") with an older reference object (e.g. "artichoke banana"), common text can be shown in normal font style, deleted text can be shown in strike-through style, and newly added text can be shown as underline. In this illustration, the red-line version can be "apple banana cherry").

In some examples, color coding can be used. In varying examples, red-line can be displayed with word-level, subword (e.g. syllable or letter-grouping token), or character-level changes.

A "regulation" is a regulatory document to which compliance of a database is required. Descriptions of regulations herein are also applicable to other documents having a mapping or control relationship to a database. A regulation can incorporate multiple sections dubbed "requirements" for which a relationship to the database is present, required, or desired. Requirements can be hierarchically organized, with top-level requirements dubbed "controls," and second-level requirements dubbed "sub-controls." The term "subordinate requirements" encompasses sub-controls as well as any lower-level requirements that may be present. Commonly, a requirement can have a "key" (e.g. "AC-3" or "3.1.1") and "content" (e.g. one or a few paragraphs of text). Some requirements can also have a "title" (e.g. "Fastener Hardness"). A "content data item" refers to a data item through which content can be accessed, which can be a copy of the content itself, or a locator for the content. The term "feature" can refer to a requirement, its content, another field of the requirement, or a text fragment found within the requirement, and can also apply to documents other than regulations.

A "repository" is a collection of data stored in computer-readable form. A "document repository" is a collection of regulations or other documents.

A "score" is a numerical assessment of one or more data objects. "Matching score" is a measure of similarity between two objects, and is described further below. "Coverage score" is an example of a matching score, and is described further above. While a score is often a number, this is not a requirement: some scores described herein can be vectors or arrays.

"Similarity" (or sometimes "matching score") refers to a quantitative measure of likeness between two objects. In some disclosed examples, likeness can be determined based on text, in a "keyword search" procedure, or based on semantic content, in a "semantic search" procedure. As an illustration of the latter, cosine similarity can be used between vector representations of keywords, text fragments, other tokens, collections thereof, or documents. However, this is not a requirement and other measures can be used. In the context of keyword searches, similarity can be determined between (i) a keyword or collection thereof, and (ii) another collection of keywords or a document. Exemplary keyword-based similarity measures include, without limitation: Term Frequency—Inverse Document Frequency (TF-IDF), which combines the relative frequency F of a term T within a document D and the fraction of documents {D} containing the term T; BM25 which ranks documents {D} according to the relative frequency F of term T; or Jaccard similarity, which measures a degree of overlap, e.g. number of keywords common to two sets of keywords, divided by the total number of keywords in a union of the two sets. Another related term "distance measure" refers to a quantitative measure of the difference between two objects having representations in a common space. Distance measure and matching score can be complementary. Thus, two objects having a distance measure of zero are identical; two objects having a small distance measure can be similar or can have a high matching score; and two objects having a large distance measure can be dissimilar or can have a low matching score. To illustrate, Jaccard distance JD and Jaccard similarity JS are related as JD=1−JS.

"Software" refers to computer-executable programs, instructions, or associated data structures. Software can be in active or quiescent states. In an active state, software can be loaded into memory, or can be undergoing execution by one or more processors. In a quiescent state, software can be stored on computer-readable media, awaiting transmission or execution.

A "split" is a partitioning of a larger data object into one or more smaller disjoint data objects. In some examples the smaller objects can omit some material of the larger object while, in other examples, every data item of the larger object can be included in one of the smaller objects. To illustrate, a parent requirement (e.g. a control) of 500 words can be split into three subordinate requirements (e.g. sub-controls) of 100 words each, with 200 words left over.

A "statistic" is a property calculated from a data object, such as a length of a string, or a percentage change from a previous version. Inasmuch as a data object can be a set of data items, a statistic can be a property calculated over those items, such as a mean, standard deviation, or maximum. While a statistic is often numerical, this is not a requirement, and some statistics, such as classifications, can be binary or categorical variables. Statistics of a plurality of records can be combined together to obtain an "aggregated statistic" over those records. To illustrate, each record can have a respective class, and an aggregated statistic can specify how many of those records have a particular class.

A "subset" is a collection of at least one item from a set. While the cardinality of a subset is often less than that of its parent set (thus, a "proper subset"), this is not a requirement and, in some examples the subset can be identical to its parent set. To illustrate, if a program calls for a subset containing three highest ranked items to be reported from a set, and the set contains only three items, then the reported subset may contain all the three items in the set.

A "table of contents" is a list of headings in a document, and can optionally include page numbers, links, or other locators of the corresponding material in the document. FIG. 3C shows an example table of contents, in which some headers include control key (e.g. 321) and control title (e.g. 322).

"Text" is a representation of one or more words (e.g. "apple"), or printable characters (e.g. "01.01.2020"), which convey semantic meaning. While text can often be an electronic representation, this is not a requirement. Electronic text can be stored in memory or on a storage device, with suitable encoding, and can also be encrypted. A "text fragment" is a portion of text from a larger passage or document. Some text fragments can be sentences, clauses, noun phrases, verb phrases, single words, or named entities found in a library. In some examples of the disclosed technologies, text fragments can be used for mapping coverage.

"Training" refers to a process of determining values (coefficients) to be applied within an ML tool, e.g. at neurons of a neural network, so as to render the ML tool operable for its desired functionality. In the context of a classifier, training can be performed using a training data set comprising images for which a desired classification is already known. Comparison of actual output of a trainee ML classifier with the desired classification can provide a loss function, which can be propagated backward through the ML classifier, applying gradient descent or another established technique to tune the coefficients at each layer. As training proceeds, the classifier outputs can converge to the desired classifications, and the magnitude of the loss function can decrease. When the loss function has decreased to below a predetermined threshold, the classifier can be validated and deemed "trained." The trained classifier can be deployed to classify new data (e.g. a requirement) for which a correct classification is not already known. Training phases can include pre-training and fine-tuning. Some disclosed examples fine-tune pre-existing ML tools to achieve desired behavior. Generally, training records can be assembled providing input examples together with desired outputs created or validated by a human expert. A training dataset comprising such records can be applied to fine-tune a base ML tool, to achieve desired behavior. In examples, the desired outputs can demonstrate sensitivity to augmentation clues in a document, or to cues provided by a user, leading to a fine-tuned ML tool which can exhibit similar behavior during inference on other inputs.

A "visualization" is a rendering of output data, e.g. for a client, in a visual form. A visualization can include text tokens, text output data, graphical output, or images, in any combination.

Example Deployment-Architecture and Dataflow

FIG. 1 is a hybrid diagram 100 illustrating an example deployment of disclosed technologies. Shown in FIG. 1 are some software and database entities, with which the architecture and example dataflows of this example can be described. The illustrated architecture and dataflows enable management of an organization's implementation database (150) in conjunction with regulations (112). FIG. 1 is illustrative: any given deployment of disclosed technologies can omit certain illustrated features, can implement variations of other features, or can add additional features. Database entities and repositories are shown as drum-shaped symbols; trained machine-learning (ML) tools are shown as trapezoids; and other software entities are shown as rectangles with rounded corners. Various other shapes are used to represent documents, reports, database records, and other data objects. Certain arrows in FIG. 1 are asymmetric: the larger arrowhead indicating a principal direction of dataflow.

1. Requirement Extraction

Requirement extraction subsystem 120 can address Task (A), namely digesting regulations 112 into their constituent parts. Through a user interface (UI) for subsystem 120, client 102 can select regulation 112 from repository 110. Control extraction module 125 can identify top tier requirements ("controls") and store corresponding requirement records 132 in extraction database 130. In some cases, sub-control extraction module 127 can identify second tier requirements ("sub-controls") within respective controls. As requirements are identified by modules 125 or 127, respective records 132 can be written to extraction database 130, each record having multiple fields 136 . . . 139 as described further in context of FIG. 2.

Module 125 can utilize trained ML tools, e.g. tool ML1 121 can identify control candidates within regulation 112, or tool ML2 122 can generate a regular expression ("regexp") to match desired requirement keys. Module 127 can also utilize ML tool 123, e.g. to generate program code which, upon execution, identifies a next sub-control within regulation 112.

Each regulation 112 can be identified with a respective schema 182 stored in framework database 180. Schemas 182 can have multiple fields 186 . . . 189 as shown. For example, regexps or sub-control extraction program codes can be added to this schema as they are determined (e.g. by ML tools 122-123), for subsequent re-use and attendant computational efficiencies.

2. Delta Analysis

Delta analyzer 140 can address Task B, namely comparing two versions 112 of a requirement, or aggregating such comparisons into statistics over the entire regulation. The path from extraction databases 130 to delta analyzer 140 is shown as double arrows to indicate that module 140 receives inputs of two versions 112.

To illustrate, a given requirement of a first regulation version can be classified as "unchanged" or "updated," as compared to a corresponding requirement of an earlier (second) version of the regulation. Alternatively, the given requirement may not have any counterpart in the earlier version, in which case it can be classified as "new." In varying examples, these classifications can be written to records 132, stored in delta database 142, or transmitted to client 102 as report(s) 190. Conversely, delta analyzer 140 can identify as "deleted" or "withdrawn" requirements present in an earlier version and absent in the later version.

In addition to classification, delta analyzer 140 can generate a red-line version of a compared requirement, explicitly showing the changes between versions. ML tool 144 can also be used to generate a human-readable text summary of the changes between versions. The red-line version or the summary can be stored, e.g. in delta database 142, or issued among report(s) 190.

3. Correlation

Correlation subsystem 160 can include one or more tools in support of maintaining or establishing relationships between requirements 132 of regulations 112 and entries 152 of implementation database 150.

4. Requirement Mapping

Requirement mapper 162 can address Task (C), namely mapping a regulation 112 or its constituent requirements 132 to an organization's implementation database 150. Requirement mapper 162 can compare requirements 132 from extraction database 130 with entries 152 of implementation database 150. Comparison can be performed with varying granularity, e.g. by control, by sub-control, or by individual semantic tokens within a given requirement. Mapping can determine, e.g. which entries 152 are relevant to a given requirement 132, or which is the best matched entry 152 for the given requirement 132. Corresponding report(s) 190 can be outputted to client 102 at varying levels of granularity. Like requirement records 132, entries 152 can also have multiple fields 156 . . . 159.

For each requirement 132, corresponding records 172 can be stored in mapping database 170. Each record 172 ("R→E") can identify one or more entries "E" 152 that match or are relevant to the instant requirement "R" 132. Additionally or alternatively, reverse indexed records 174 can also be stored—each record 174 ("E→R") identifying one or more requirements "R" 132 that map to the instant entry "E" 152.

5. Coverage and Gap Analysis

Coverage and Gap Analyzer 164 can also address task (D), namely identifying gaps between regulation 112 and implementation database 150. Initially, and based on comparisons performed by mapper 162, analyzer 164 can classify each requirement 132 of regulation as "covered," "mostly covered," or "weakly covered." Report(s) 190 can be outputted to client 102 at varying levels of granularity.

Analyzer 164 can also address task (E), namely proposing an update to implementation database 150. For a requirement 132 having classification "weakly covered", ML tool 165 can be used to generate a proposed new entry for database 150. For a requirement 132 classified as "mostly covered," ML tool 165 can be used to generate a modification to an existing entry 152 (e.g. a best matched entry 152) to address the gap between requirement 132 and entry 152. In some examples, the modification can be based on textual differences between requirement 132 and entry 152. In other examples, fine-grained comparisons performed by mapper 162 can be used to identify one or more semantic tokens of requirement 132 which are not covered, and new text for entry 152 can be generated to cover these semantic tokens. Proposed updates, e.g. new or modified entries 152, can be transmitted to client 102 among report(s) 190. Upon approval from client 102, one or more of these updates can be applied to database 150. In this way, database 150 can be managed in conjunction with controlling documents 112.

Numerous variations and extensions can be implemented within scope of the disclosed technologies.

Modules 125, 127 can operate with varying amounts of interactivity, ranging from fully automated to fully manual identification (or override) of individual requirements. Client 102 can annotate candidate selections to guide subsequent automated extraction. Additional modules 127 can support additional third, fourth, etc. tiers of subordinate requirements. Client 102 can specify a depth (e.g. number of tiers) over which subordinate requirements are to be extracted. Client 102 can designate a pre-existing schema 182 to be applied to a given regulation 112. Multiple extraction databases 130 can be maintained, e.g. one for each regulation, version, or publisher.

In some examples, mapper 162 can map one or more requirements 132 selected by client 102 while, in other examples, all requirements 132 of regulation 112 can be mapped. In further examples, and for computational efficiency, mapping can be restricted to those requirements 132 which are new or updated from a previous version of regulation 112. The new or updated classifications can be obtained from delta database 142 or from requirement records 132.

Entries 174 of mapping database(s) 170 can indicate requirements 132 of multiple regulations 112 which all map to the instant entry 152. Mapping database 170 can also store arrays of scores of semantic tokens (or other requirement components) of requirements 132 vs. entries 152.

Example Requirement Records

Figure 2:
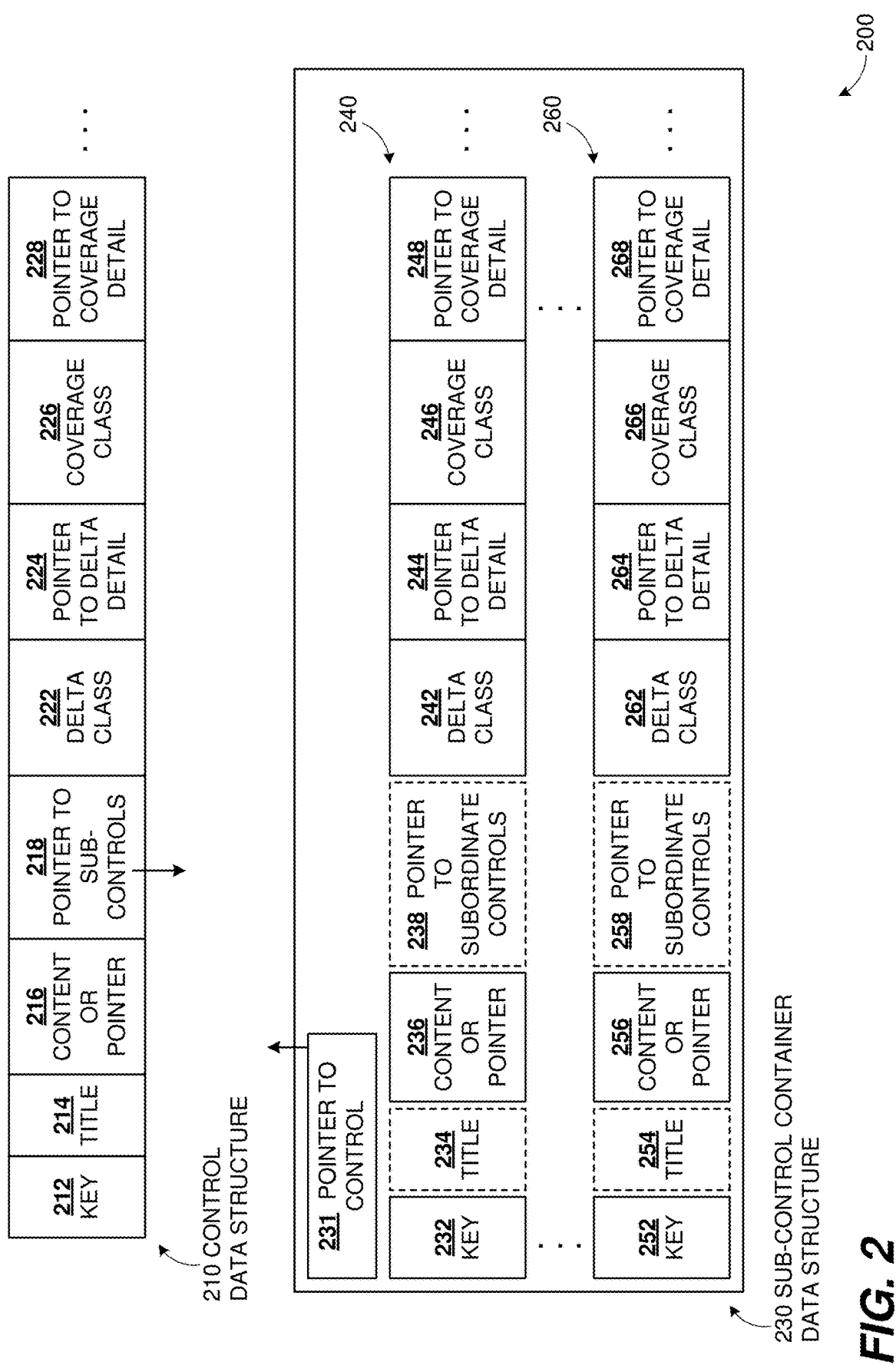
FIG. 2 is a diagram illustrating data structures for records of requirements according to some examples of the disclosed technologies.

FIG. 2 is a diagram 200 illustrating data structures for requirement records similar to 132 of FIG. 1. Data structure 210 represents a control which, as illustrated, has a plurality of sub-controls 240 . . . 260 organized into sub-container data structure 230 as shown.

Starting with control 210, the values stored in key and title fields 212, 214 can be extracted from a regulation, e.g. by a control extraction module similar to 125 of FIG. 1. FIG. 3C illustrates key field 331 and title field 332. Field 216 can store a data item corresponding to content (335) associated with key 212 (331). In varying examples, this data item can be the content itself, or a pointer to the content. In the latter case, the actual content can variously be stored as a file, as a record in a separate data structure, or as an object in a heap, or in another way. The pointer can also link to a location within the regulation itself. Field 218 can store a pointer to container 230.

Values of additional fields 222-228 can be derived from downstream analysis of control 210. Field 222 can store a classifier indicating whether control 210 is e.g., unchanged, changed, or new with respect to a previous version of the instant regulation. Field 222 can be written by a delta analyzer similar to 140. Field 224 can store a pointer to additional details of the delta analysis, e.g. red-line or summary, which can be stored e.g. in a delta database similar to 142. As shown by dotted line, examples of the disclosed technologies can incorporate additional fields in control data structure 210.

Sub-control container 230 can include header field 231 pointing back to control 210, which is the common parent control for all sub-controls 240, 260 included within container 230. Data structures 240, 260 for individual sub-controls have fields which are generally similar to corresponding fields of control 210. In some examples, sub-controls can have titles while, in other examples, sub-controls can have key and content but no title. Where sub-control titles are absent, title field 234, 254 can store a null value, or can be omitted entirely from data structures 240, 260. Similarly, in some examples, a second tier sub-control can have third tier subordinate controls, and fields 238, 258 can store pointers to containers or other data structures for the third tier subordinate controls. As for title field 234, fields 238, 258 can be set to a null value or omitted entirely where third tier subordinate controls are not used. Fields 232, 236, 242, 244, 246, 248 are similar to control fields 212, 216, 222, 224, 226, 228, and are not described further. Similarly, fields 252-258 and fields 262-268 are similar to corresponding fields of sub-control 240.

Numerous variations and extensions can be implemented within scope of the disclosed technologies.

Example Control Extraction Method

Figure 5:
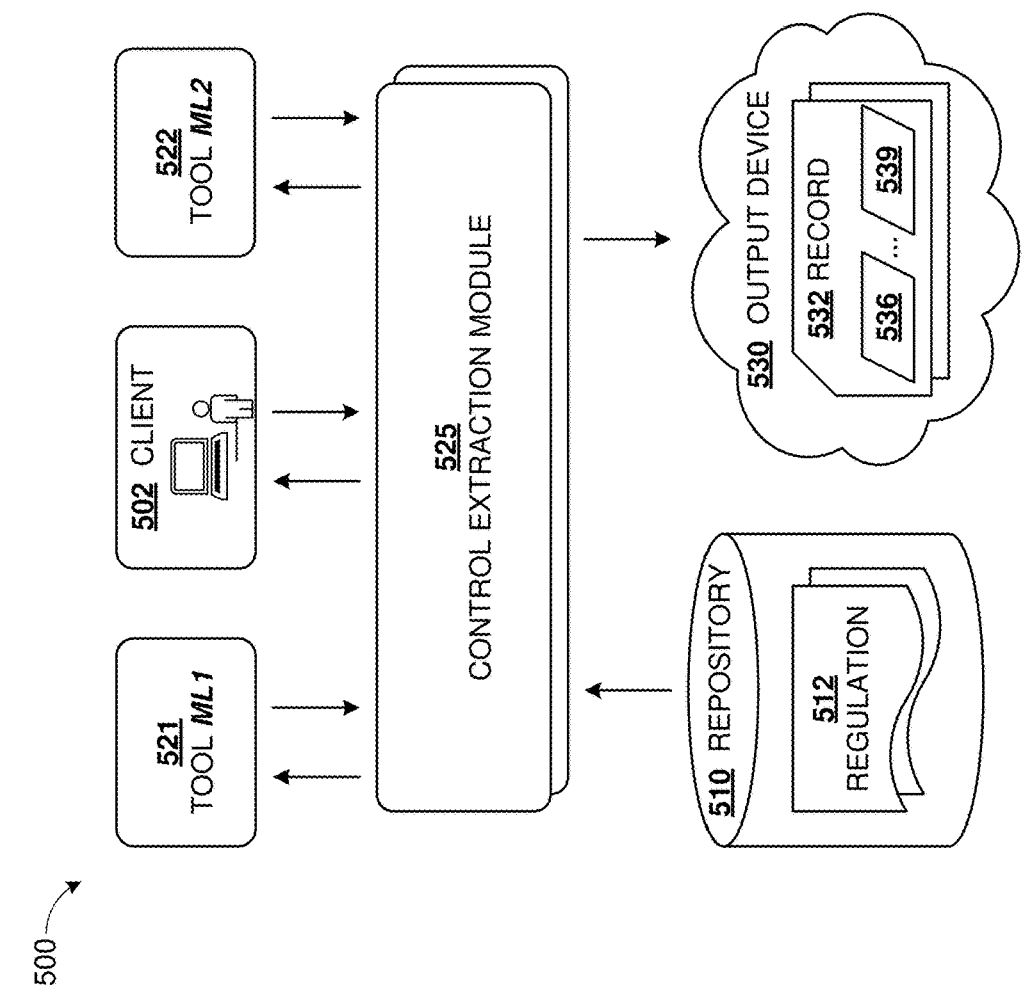
FIG. 5 is a diagram of an example environment in which control extraction methods can be performed according to the disclosed technologies.
Figure 4:
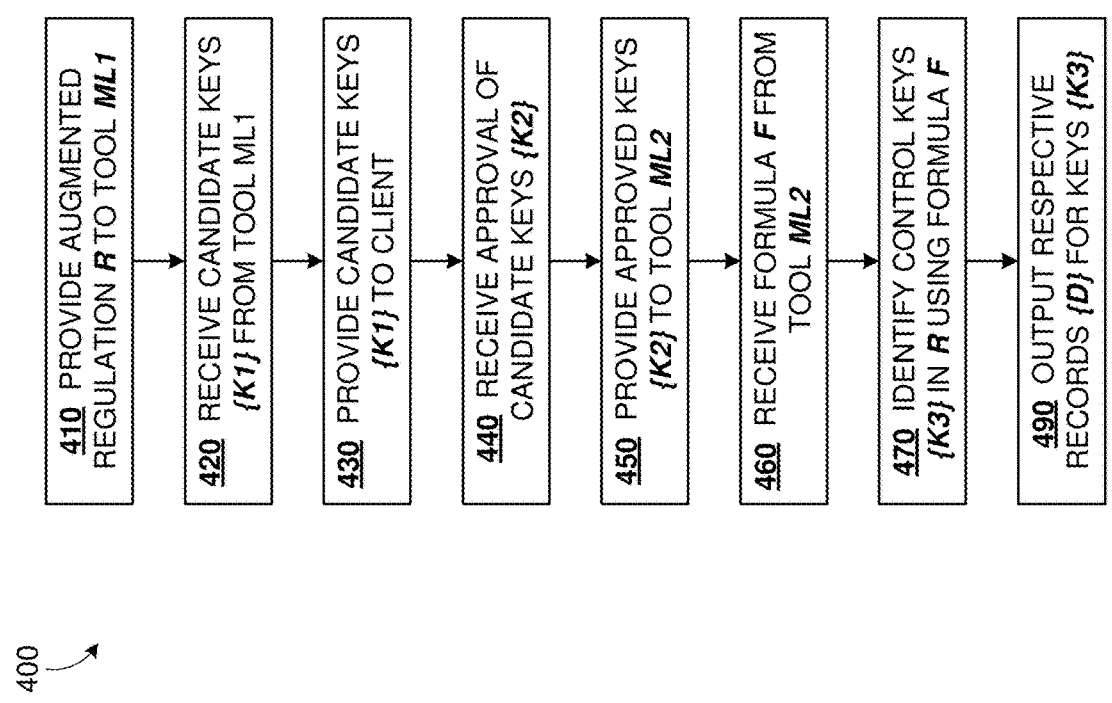
FIG. 4 is a flowchart illustrating an example method for extracting controls from a document according to the disclosed technologies.
Figure 6:
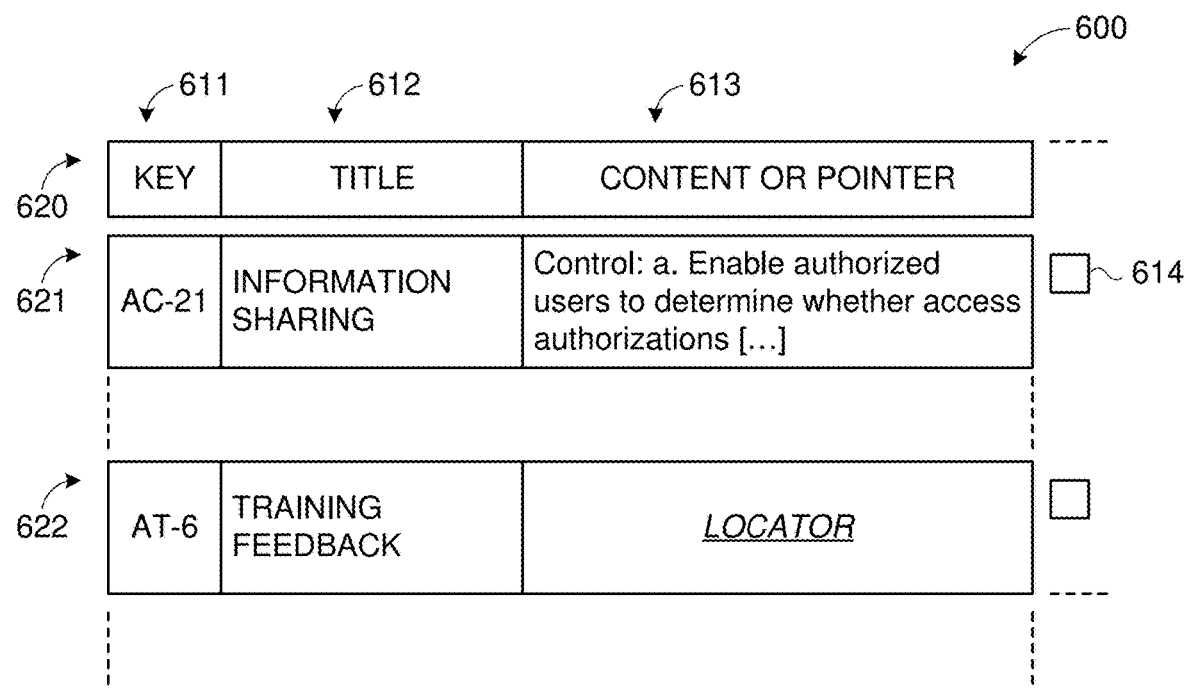
FIG. 6 shows example output from the method of FIG. 4.

FIG. 4 is a flowchart 400 illustrating an example method for extracting controls from a regulation. This method combines user guidance, regexp techniques, machine learning, and database technologies to provide efficient document processing. This method is described in conjunction with FIG. 5, which is a diagram 500 of an example environment in which the method of FIG. 4 can be performed, e.g. by control extraction module 525, and FIG. 6, which shows example output 600. Although FIGS. 4-6 are described together for convenience of illustration, they can also stand alone. That is, embodiments of any given figure need not implement all features of any other figure, or can implement variations of certain features.

At process block 410, a regulation 512 is provided, in augmented form, to a trained machine-learning (ML) tool ML1 521. The augmented form can include layout, style, or organizational information, as is often present in PDF files (portable document format, according to ISO32000 or variants). FIG. 3C illustrates different styles for key 331, title 332, text 333-334 or other portions of content 335, and sub-control key 339, sub-control title 340, or other content of sub-control 338. As described herein, any of these style variations can be used to detect requirement attributes or content boundaries.

Controls in a regulation can often be organized by keys (331, 341). At process block 420, candidate keys {K1} can be received from tool ML1 521. At process block 430, the candidate keys {K1} can be provided to client 502 and, at block 440, approval of at least a predetermined number of the candidate keys {K2}⊆{K1} can be obtained from client 502. To illustrate with reference to FIG. 3B, "3.1" 323 and "AC-21" 321 can be proposed as candidate control keys, and a client can approve "AC-21" 321 and other candidate keys having a similar structure.

At block 450, the approved candidate keys {K2} can be provided to another trained ML tool ML2 522 and, at block 460, tool ML2 522 can return formula F which distinguishes control keys within regulation 512. At block 470, formula F can be applied to regulation 512 to identify multiple control keys {K3} from regulation 512. Finally, for each identified key K3, a respective record D 532 can be outputted at block 490, e.g. to output device 530. Outputted record 532 can include, among fields 536 . . . 539, field 536 (similar to 212 of FIG. 2) storing the respective control key K3.

To illustrate, row 621 of FIG. 6 is a record D having fields indicated by column headings 620. Row 621 corresponds to a control having key K3 "AC-21" in column 611. Row 622 is a similar record D for a control whose key K3 is "AT-6."

Figure 7:
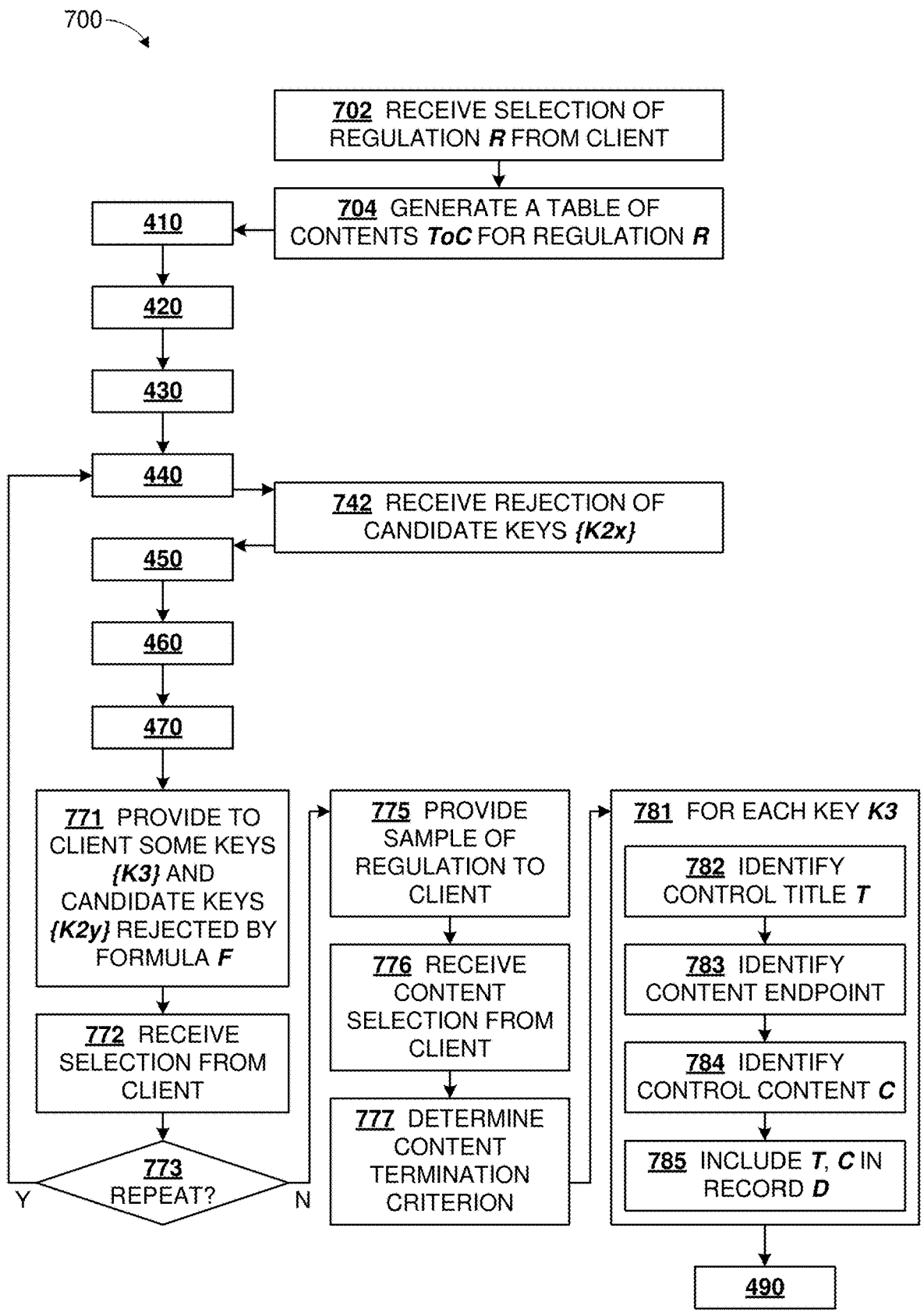
FIG. 7 is a flowchart illustrating variations and extensions of the method of FIG. 4, according the disclosed technologies.

Numerous variations and extensions can be implemented within scope of the disclosed technologies. FIG. 7 is a flowchart 700 illustrating some extensions. Icons for process blocks 410-490 are reproduced in FIG. 7 and optional extensions are shown at appropriate positions within that flow. Illustrated extensions can be employed independently, in any combination.

A first extension method can assist a client with Task (A), namely digesting regulation R 512 into its constituent controls 532. Accordingly, at optional block 702, a selection of regulation R 512 can be received. To illustrate, a user can make a selection from a drop-down menu or a listing of regulations 512 available in repository 510.

As a second extension, a table of contents can serve as a useful organizational tool within a regulation, yet some documents may not include a table of contents. Accordingly, at optional block 704, a table of contents ToC (similar to 302) can be generated for regulation R 512. Block 704 can be performed by invocation of a trained ML tool, or by a specialized table of contents generator. Some table of contents generators can employ font style cues or indentation to identify and organize document headings. (Table of contents headings can sometimes include control keys or titles, but usually also include headings that are not controls. Accordingly, available table of contents generators can be unsuitable for control extraction directly from a document.)

As a third extension, a client can be prompted to identify both approved candidate keys and rejected candidate keys, to improve accuracy of distinguishing control keys from other similar text. To illustrate, "3.1" 323 of FIG. 3B can be proposed as a candidate key and can be rejected. Accordingly, at optional block 742, one or more rejected candidate keys {K2x} can be received from client 502, and the rejected keys {K2x} can also be provided to tool ML2 522 at block 450.

As another illustration from FIG. 3C, "AC-16" 336, which is a reference to a control occurring within content of another control, can be presented to a client. Rejection of this instance of "AC-16" by a client can be used by control extraction module 125 to distinguish control keys like 321, 331 from mere references 336, e.g. based on presence or absence in table of contents 302, or based on differences in augmentation as shown in excerpt 303.

As a fourth extension, a client can be prompted to confirm or reject control keys {K3} extracted at block 470, or request that control extraction be repeated. To illustrate, a client can mark certain keys as accepted and other keys as rejected, and proceed with or without repeat. Alternatively, a client can request repeat with or without marking any of the identified keys {K3}. At optional block 771, some or all extracted keys {K3} can be provided to client 502. Candidate keys {K1} that were rejected by formula F can also be displayed. At block 772, a client's selection can be received. The selection can include markings of various displayed control keys {K3} or {K1}, or a request for a repeat. Thus, the set {K3} of identified keys can shrink through client 502's rejections, or can grow through repetitions of block 470, e.g. with different formulae F.

At decision block 773, a determination can be made whether a repeat has been requested. If yes, the extended method can follow the Y branch back to block 440 for additional approvals or rejections by client 502. If no repeat is requested, the method can proceed via the N branch to the sixth extension (if implemented) at block 775, or to blocks 781 or 490.

As a fifth extension, records outputted at block 490 can include additional fields, e.g. for title or content of each control key {K3}. Accordingly, at block 781, additional operations 782-785 can be performed for each identified key {K3}. At block 782 a control title T can be identified, e.g. from text immediately following the control key, optionally having a font style similar to the control key but different from subsequent text. Key 331 and Title 332 provide an illustration. At block 783, a content endpoint can be determined based on one or more termination criteria and, at block 784, the content can be identified as material following the title T, up to the content endpoint. At block 785, title and content fields of record D can be written. A title field (similar to 214 of FIG. 2) can store the title text, and a content field (216) can store the content material, or a locator of the content material, as disclosed further herein. FIG. 6 illustrates a title for rows 621-622 outputted in column 612, and a respective content data item outputted in column 613. In row 621, the content text is outputted, with the "[ . . . ]" indicating a user interface button for expanding the entire content text, e.g. in a side pane or pop-up window. Row 622 shows only a locator for the content text, which can be a hyperlink or other reference as described herein. In FIG. 6, each row also has a user interface selection button 614, whereby a given control can be selected for further tasks described herein.

Content termination criteria can include: occurrence of a subsequent control key; a predetermined discontinuity in text augmentation (such as a change in indentation or font style); or an end of regulation 512.

As a sixth extension, the method can utilize client guidance for determining a content termination criterion. At block 775, one or more samples of regulation R 512 can be provided to client 502 and, at block 776, one or more content selections within the sample can be received from client 502. To illustrate, the sample can be a chapter of the regulation including one or more control keys {K3}, or a portion including two successive control keys. The selection can indicate a content endpoint and, optionally, a content starting point (which can default to a position immediately after a control title). FIG. 3C provides an example with content 335 situated between title 332 and control key 341. In some examples, the client's selection can be a box drawn around control content in the sample, identifying both the starting point and the endpoint of the selected sample content. At block 777, a content termination criterion can be determined based on this selection. To illustrate, control extraction module 525 can recognize a change of font style or indentation at the selected endpoint, as a content termination criterion.

Still further, regulation 512 can be stored in and retrieved from a repository 510. Records 532 can be variously outputted to a database similar to extraction database 130 of FIG. 1, to another storage system, over a network to another computing device, or to a display.

Trained ML tool 521 (or tool 121 of FIG. 1) can be based on a pre-trained layout recognition model tool (such as LayoutLM) which can recognize augmentation in a document, with supplemental fine-tuning using training data containing sample documents and corresponding requirements as determined by a human expert. In some examples, ML tool 522 (122) can be an off-the-shelf LLM able to mine regular expressions, e.g. from a regexp database. In other examples, it can be desirable to distinguish control keys from other instances of regexp-matching text (e.g. 336 of FIG. 3C) which are not control keys. In such cases, ML tool 522 can combine regexp output of the off-the-shelf tool (to identify regexp instances) with output of a fine-tuned layout language model (to discriminate among these instances based on varying augmentation).

Example Sub-Control Extraction Method

Figures 8, 9:
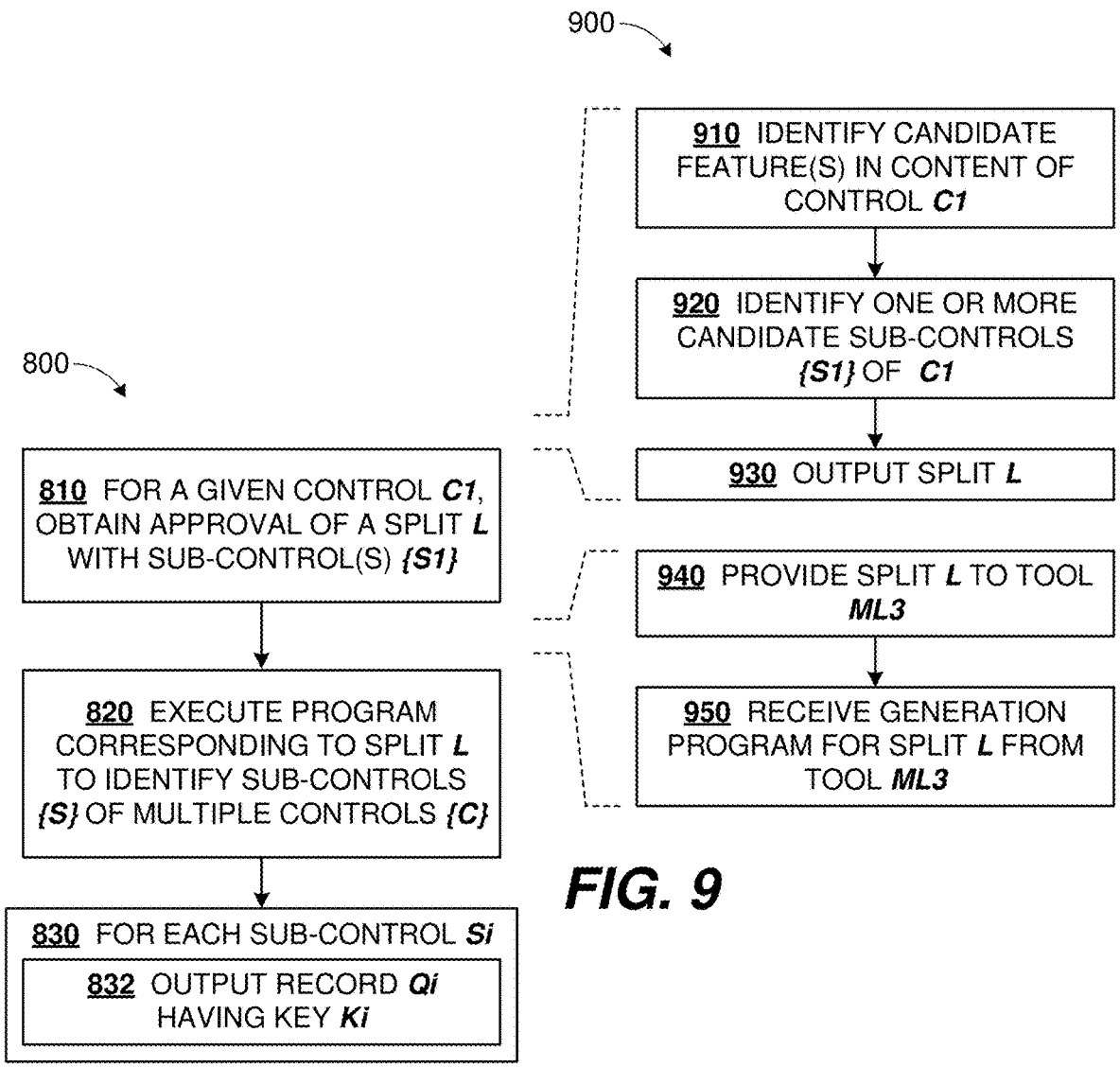
FIG. 8 is a flowchart illustrating an example method for extracting sub-controls from a document according to the disclosed technologies.
FIG. 9 is a flowchart illustrating variations and extensions of the method of FIG. 8, according the disclosed technologies.

FIG. 8 is a flowchart 800 illustrating an example method for extracting sub-controls from a document. In this method, program code is used to extract sub-controls, e.g. based on text or augmentation patterns.

At block 810, user approval of a proposed split L can be obtained, the split L identifying one or more candidate sub-controls. To illustrate with reference to FIG. 3C, a split L(a,b) which identifies candidate sub-controls 333, 334 can be rejected, while another proposed split L(1,2) which identifies candidate sub-controls 337, 338 can be approved. Then, at block 820, a program corresponding to approved split L(1,2) can be executed to identify sub-controls {S} of multiple controls {C}. For example, the program can search for patterns matching those of the approved split.

Block 830 can iterate over identified sub-controls {S}. At block 832, a respective record Qi (e.g. similar to 240 of FIG. 2) can be outputted for sub-control Si. The record can contain at least a key Ki (232) of sub-control Si.

Numerous variations and extensions can be implemented within scope of the disclosed technologies.

FIG. 9 is a flowchart 900 illustrating some extensions of the method of FIG. 8. Process block 910-930 illustrate a first extension, which can be performed prior to block 810. At block 910, candidate features can be identified in content of control C1. Content 335 of FIG. 3 provides an illustration: a list of elements can be identified, such as "a," "b" or "(1)," "(2)" (339). Based on these features, one or more candidate sub-controls {S1} can be identified at block 920. Thus, with list "a" "b," candidate sub-controls 333, 334 can be identified. At block 930, the split L (a,b) can be outputted, which can be a visualization similar to the page shown in FIG. 3C, with candidate sub-controls 333, 334 outlined in color.

Block 910 can be performed by a trained ML tool. In some examples, this tool can be guided by a client providing a number of sub-controls present in a given control. In other examples, the tool can be guided by either a program or a sample sub-control split stored with schema 182 in framework database 180.

In alternative scenarios, an instant regulation or control can be identified as conforming to a pre-existing schema (182). The schema can be identified automatically, e.g. based on publisher name (311) recognized in front matter of a document, or based on a schema associated with another version of the instant regulation. A pre-existing sub-control extraction program for this schema can be selected from a framework database (180) which can also store programs for other schemas. In some examples, a single regulation can employ different sub-control patterns in different sections, and the framework database can support multiple sub-control extraction programs for the instant regulation. Then, the selected sub-control extraction program can be used to generate a split and present it to a client (similar to block 930). Upon approval of the split at block 810, the same program can be used at block 820.

Process blocks 940-950 illustrate a second extension, which can be performed between blocks 810-820. At block 940, the approved split L can be provided to a trained ML tool (similar to tool 123 of FIG. 1) and, at block 950, a generation program can be received from the ML tool. This program can be used at block 820 to replicate the approved split over all or selected parts of an instant regulation, and can also be stored in a schema (182) for later use. In some examples, the ML tool can be a publicly available LLM tool such as GPT4 or ChatGPT while, in other examples, a purpose-built ML tool can be trained to generate code suitable for various document splits.

In further examples, a content endpoint can be determined based on one or more content termination criteria. Sub-control content can be identified as material following a corresponding sub-control key (or sub-control title), up to the content endpoint. A corresponding content data item (236) can be stored in the sub-control record (240). Content termination criteria can include: occurrence of a subsequent sub-control key (e.g. content of candidate sub-control 333 can end with "; and" immediately preceding the next sub-control key 334); or an end of the parent control's content (e.g. sub-control 338 can end where control "AC-22" begins).

A sub-control title can also be identified. To illustrate, title 340 can be identified as text following sub-control key 339. The change in font style between "RETRIEVAL" and "Implement" can be used to detect an endpoint of the title. The title (234) can also be added to sub-control record (240).

Some sub-controls can have additional levels of subordinate controls. In examples, a search can be performed to identify such subordinate controls, and respective records can be outputted comprising text of the identified subordinate controls.

In some examples, the trained ML tool (123) used at block 940 can be an off-the-shelf LLM capable of code generation. In other examples, a base LLM can be fine-tuned to recognize additional cues inputted by a client (including e.g. numbers of sub-controls; a client's rejection of candidate sub-controls or candidate sub-control keys; or sub-content termination criteria), and adapt generated code accordingly.

Example Delta Analysis Method

FIG. 10 is a flowchart 1000 illustrating an example method for delta analysis of controls. The method is applicable to regulations having multiple versions, and can be directed to task (B), namely identifying changes between old and new versions of regulations. Although described in terms of requirements such as controls or sub-controls, this method can also be applied to similar records of other document types. Exemplary outputs 1201-1203 are shown in FIGS. 12A-12C.

At process block 1010, a selection of a regulation can be received, e.g. from client 102. The regulation can have versions R1, R2. At process block 1015, a directory of requirement records for version R1 can be obtained. Each record D1 can have fields for a respective key K and content C, and optionally title T, similar to fields 212, 214, 216, or 232, 234, 236 described in context of FIG. 2. In some examples, the directory can be retrieved from a database similar to 130 while, in other examples, the directory records D1 can be generated from regulation version R1 using control extraction methods as described in context of FIG.

4-7 or elsewhere herein. At process block 1020, a similar directory of requirement records for version R2 can be obtained.

Loop block 1030 indicates performance of process blocks 1035-1050, 1080-1085 for each record D1 in a group {D1}. In varying examples, records {D1} can be processed sequentially or concurrently, e.g. by multiple processors or threads.

Within this loop and for an instant record D1, a matching record D2 can be identified at block 1035, e.g. a record D2 whose key or title matches that of record D1. For example, records {D2} in the second directory can be searched. An index or hash table can be used to increase search efficiency.

At blocks 1040, 1045 respective content C1, C2 of records D1, D2 can be obtained. In varying embodiments, either content C1, C2 can be read directly from record D1, D2; or content C1, C2 can be obtained from a location specified in the content field of record D1, D2.

At block 1050, content C1, C2 can be compared. Comparison can be performed at varying granularity. To illustrate, an initial comparison can be binary over entire content C1, C2, to determine whether content C1≡C2 and the content is unchanged. Another comparison can be performed at the word level, e.g. to identify how many words have been added or deleted, while also determining total word counts. Further comparisons can be performed at token or character level, e.g. for non-word material in content C1 or C2. These or other comparisons can be performed in any combination. Either version R1, R2 can be regarded as a reference or baseline.

In some examples, a recursive comparison algorithm can be used: a longest matching sequence can be identified between C1, C2, which partitions each into left and right portions, e.g. C1L, C1R, C2L, C2R; and this step can be recursively performed between C1L, C2L and between C1R, C2R, until all matches have been identified-leaving unmatched content as addition or deletion depending on whether unmatched content in the earlier or the later version.

At block 1080, one or more measures (dubbed "scores") of content change can be determined. The measures can be quantitative (e.g. "20% changed" or "99% same") or as categorical variables (e.g. "minor change" or "major change"). In varying examples, increasing values of quantitative measures can correspond to greater amount of change or greater match (lesser amount of change).

At block 1085 the key K1 or title T1 of record D1 can be outputted, along with the one or more measures of content change. To illustrate, FIG. 12A shows output records 1221-1223 organized as fields whose column labels are shown in row 1220. Row 1221 shows an output record D1 for a control having key K1 "AC-1" in column 1211, title in column 1212, and a measure of content change (69%, outputted as text and graphically) in column 1213. Records 1222-1223 show corresponding outputs for other records.

Numerous variations and extensions can be implemented within scope of the disclosed technologies. FIG. 11 is a flowchart 1100 illustrating some extensions. Dotted lines indicate where some of these extensions can be incorporated into FIG. 10.

As a first extension, the comparing of block 1050 can be used to generate a red-line content version at block 1155, and the red-line version can be outputted at block 1160. This extension can be restricted to records D1 which were found to be changed. To illustrate, FIG. 12B shows an excerpt of a red-line version of control AC-1 of NIST Standard 800-53 comparing Revisions 4 and 5. Text deleted from Rev. 4 is shown with strikeout, and text added at Rev. 5 is shown underlined. Unmarked text is common to both versions. At the top left legend 1226 displays the key of a control for which the instant red-line is presented. In some examples, this key or control can be selected on a display similar to FIG. 12A, using a user interface button in column 1214.

As a second extension, content C1, C2 can be provided to a trained ML tool ML4 (similar to 344 of FIG. 3) at block 1165, with a prompt to generate a summary of content changes. In varying examples, content C1, C2 can be provided individually (e.g. at any point after blocks 1040, 1045 have been performed) or as a red-line version (e.g. after block 1155 has been performed). At block 1170, the summary can be received from tool ML4 (144), and at block 1175 the summary can be outputted. This extension can be restricted to records D1 which are changed, e.g. C1/C2. To illustrate, FIG. 12C shows a summary of changes to control AC-1 of NIST Standard 800-53 from Rev. 4 to Rev. 5. At the top left legend 1236 displays the key of a control for which the instant summary is presented. In some examples, this key or control can be selected on a display similar to FIG. 12A, using a user interface button in column 1214.

The red-line content version or the summary can be stored, e.g. in database 142 of FIG. 1, and linked from records D1 using fields 224, 244 of FIG. 2.

In some examples, the selection at block 1010 can specify a regulation without specifying any particular versions and the method can default to comparing two most recent versions. In other examples, the selection can specify one or both versions to be compared, with a default selection of either version R1, R2, if not expressly selected.

In some examples, the method can be invoked when version R1 is newly received. In such case, block 1015 can perform the control extraction method of FIG. 4 or a variant, while block 1020 can retrieve pre-existing records D2 from a database 130.

In some examples, a content change score Sa, in percent, can be calculated based on word count of the older version wOld, words added wAdd in the new version, and words deleted $$wDel: Sa = 100*(wAdd+wDel)/wOld.$$

In further examples, block 1035 can be extended to identify records D1 for which no matching record D2 is found. Such records can be designated "New" if version R1 is newer than R2 or "Deleted" if version R1 is older than R2. Block 1080 can be extended to classify records D1 ("delta classification") based on their content change scores, or on their designation as "New". The classification can be output at block 1085 or stored along with records D1 (222, 224, 242, 244 of FIG. 2). Aggregate statistics of the classifications can be calculated and outputted.

Figures 13A, 13B:
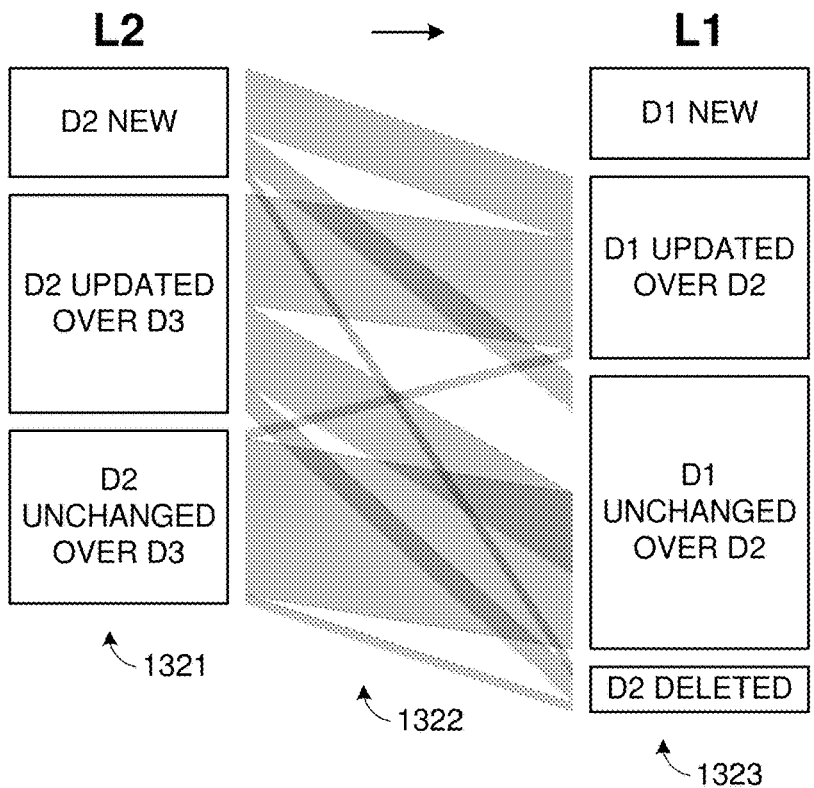
FIGS. 13A-13B are diagrams illustrating correlations of delta classifications across versions, according the disclosed technologies.

The matching records D1, D2 identified at block 1035 can also be used to correlate changes across versions. To illustrate for a case with versions in order R3 (oldest), R2, R1 (newest), changes from D2 (of R2) to D1 (of R1) having classification L1, can be tabulated against changes from D3 (of R3) to D2 having previously determined classification L2, as shown in table 1301 of FIG. 13A. Then, diagram 13B can be generated to render the correlations of classifications L1, L2 in graphical form 1302. Heights of the classification boxes 1321, 1323 can be proportional to the total number of requirements having that classification, and the height of each band 1322 can be proportional to the number of requirements having a given pair of classifications (L1, L2). Thus, of 12 records D2 classified as new, 7 were updated in R1, 4 were unchanged in R1, and 1 was deleted. Similarly, of 20 records D1 classified as Updated, 7 were new in R2, 12 were updated in R2 over an earlier R3, and 1 was unchanged in R2 from R3.

In some examples, the trained ML tool (144) used at blocks 1165-1170 can be an off-the-shelf LLM capable of text summarization. In other examples, a base LLM can be fine-tuned to recognize significance of various changes based on semantic content according to a predetermined knowledge model, and adapt generated summaries to present changes in order of decreasing significance.

First Example Requirement Mapping Method

Figure 14:
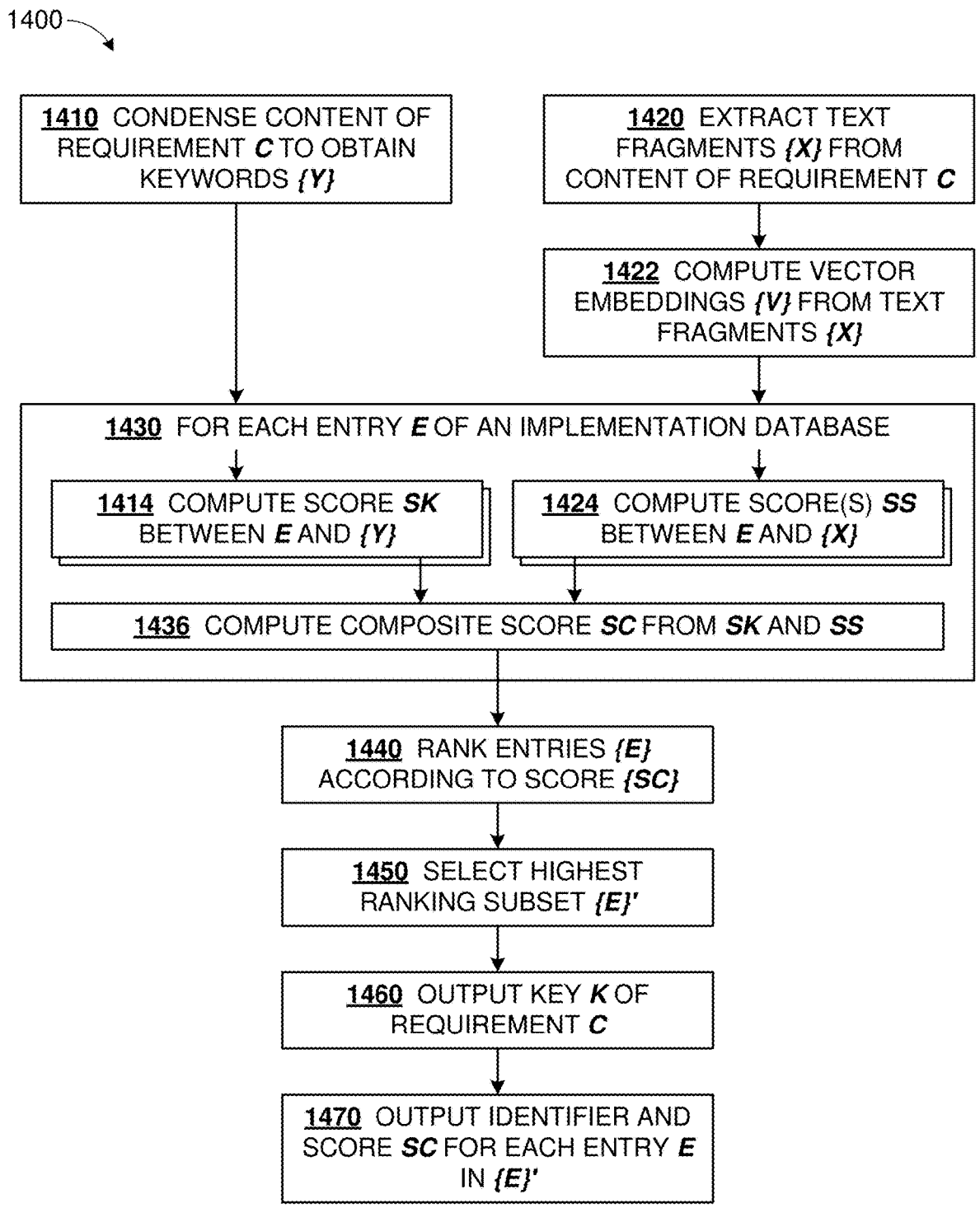
FIG. 14 is a flowchart illustrating a first example method for requirement mapping according to the disclosed technologies.
Figure 15:
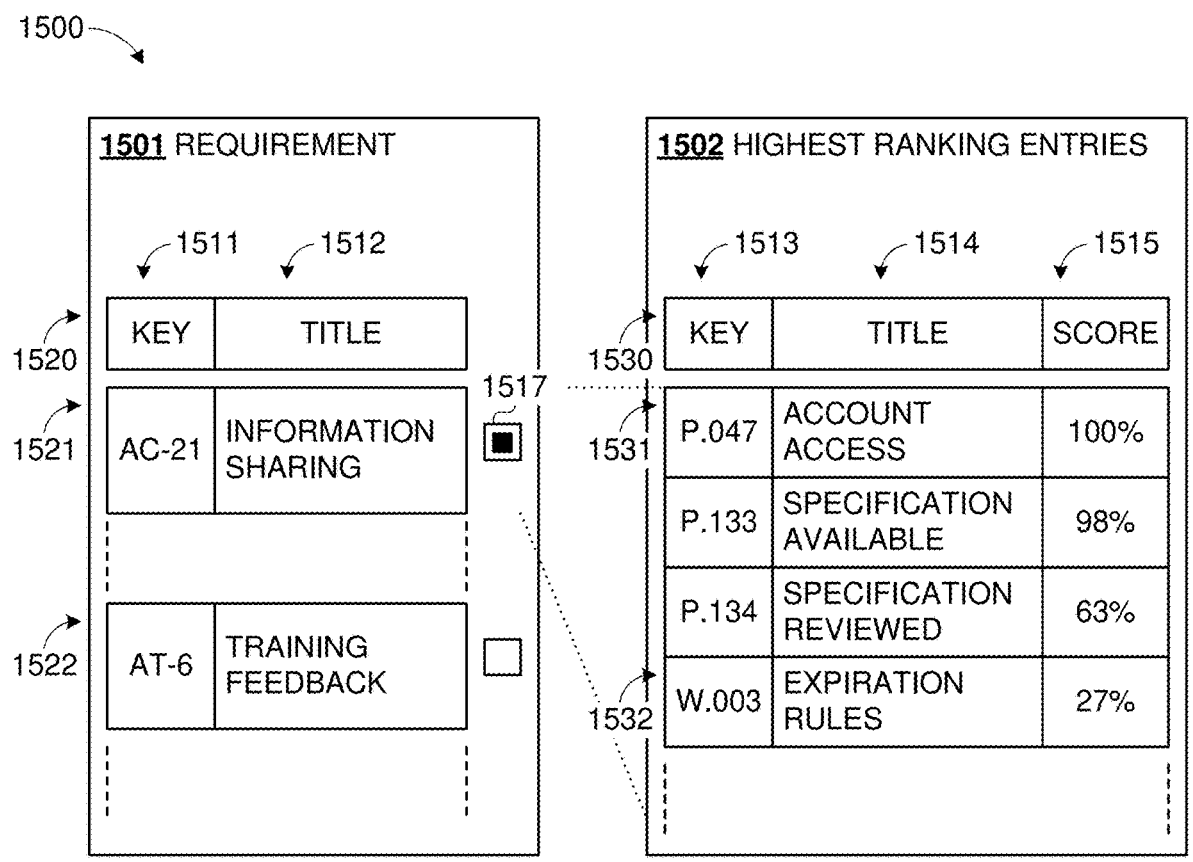
FIG. 15 shows example output from the method of FIG. 14.

FIG. 14 is a flowchart 1400 illustrating an example method for requirement mapping according to the disclosed technologies. In this method, requirements in a regulation are mapped to entries in an implementation database, addressing task (C). Keyword search and semantic search can be combined to provide diversity in mapping techniques, allowing entries that may score poorly, in one metric, to be picked up by another metric where they may score better. For further diversity, multiple strategies can be performed with each of keyword search and semantic search, with the various search strategies' scores combined into a single composite score for each entry. Although the method is described for a single requirement C, the method can be extended to some or all requirements in a regulation. The method can be performed by requirement mapper 162 of FIG. 1. Example output 1500 is shown in FIG. 15.

Initially, at process blocks 1410, 1420, 1422 preprocessing can be performed on the content of a requirement C (132), which can be a control or sub-control as described herein. At process block 1410, content can be condensed to obtain keywords {Y}. In examples, stopwords and other boilerplate (e.g. recognized from a named entity library) can be removed. Remaining words can be lemmatized to reduce grammatical variations into a common root form.

At process block 1420, text fragments {X} can be extracted from the content. Varying degrees of granularity can be used, such as words or other tokens, phrases, sentences, paragraphs, or the content in entirety. Then, at block 1422, vector embeddings {V} can be computed from text fragments {X} according to a predetermined knowledge model. Similar preprocessing can be performed for entries E (152) of an implementation database (150).

Compound process block 1430 describes operations performed for each entry E among a plurality of entries {E}. At process block 1414, a keyword search procedure can be used to calculate a first score SK between entry E and keywords {Y}. Similarly, at process block 1424, a semantic search procedure can be used to calculate a second score SS between entry E and text fragments {X}, e.g. based on vector embeddings {V} of control C and corresponding vector embeddings of entry E. As indicated by multiple blocks 1414 shown in FIG. 14, multiple keyword search procedures 1414 can be employed, using respective scoring functions. In examples, these functions can include a measure of Jaccard similarity JS (including Jaccard distance JD=1−JS), best matching function BM25, or TF-IDF (term frequency-inverse document frequency). In a like manner, one or more than one semantic search procedures 1424 can be employed. In varying examples, semantic search procedures can be applied with varying text granularity, varying knowledge models, or with varying similarity measures. To illustrate, some similarity measures can be based on Cartesian distance between high-dimensional vectors representing content of the requirement and the entry, while others, such as cosine similarity, can be based on angular distance between the two vectors.

Illustratively, if three keyword search procedures 1414 and two semantic search procedures 1424 are used, a given requirement C can have 3+2=5 scores for each entry E. If there are 100 entries {E}, there may be 300 first scores SK and 200 second scores SS, or 500 scores altogether, for one requirement C.

Whether two, or more than two, search procedures are employed in blocks 1414, 1424, all first and second scores SK(E), SS(E) for an instant entry E can be combined at block 1436 to compute a composite score SC(E). In varying examples, block 1436 can perform the combining as a sum, product, or greatest value of the constituent first and second scores. To illustrate, if three entries E have respective scores 3, 5, 7 using three search functions, the additive approach yields a composite score SC=3+5+7=15, the product approach yields SC=3×5×7=105, and the greatest value approach results in SC=max (3, 5, 7)=7. In further examples, the combining can be performed using reciprocal rank fusion, described further herein. Any of these composite scores can also be scaled, e.g. to obtain results within or spanning a predetermined range, such as [0, 1].

Then, at block 1440, the entries {E} can be ranked according to their respective composite scores {SC}, and at block 1450, a highest ranking subset of the entries {E}'⊆ [{E} can be selected. At block 1460, at least key K of requirement C can be outputted and, at block 1470, an identifier and composite score SC can be outputted for each entry {E}'. To illustrate, FIG. 15 shows requirements table 1501 having rows 1521-1522 for respective requirements, with respective fields as indicated by column labels 1520. in which row 1521 has been selected as shown by indicia 1517. Key K "AC-21" of row 1521 is outputted in column 1511, as well as title in column 1512.

Table 1502 shows highest ranking entries {E}' for selected requirement 1521 in respective rows 1531 . . . 1532. The fields are indicated by column labels 1530. As illustrated for row 1531, both key K "P.047" and Title are outputted in columns 1513, 1514 and composite score SC 100% is outputted in column 1515. Other rows of table 1502 are similar, organized in rank order from 100% to 27% composite score 1515.

Numerous variations and extensions can be implemented within scope of the disclosed technologies, some of which are described above or elsewhere herein.

In some examples, a reciprocal rank fusion technique can be used to combine scores at block 1436. For the instant entry E, each of the one or more first scores can be converted to an offsetted rank. To illustrate, if entries E1, E2, E3 have Jaccard similarity scores 0.7, 0.9, 0.8—a larger Jaccard similarity indicating a better match-then these can be converted first to ranks 3, 1, 2, and an offset can be added, such as 60. Thus, by Jaccard based keyword search procedure, entry E1 can have offsetted rank 3+60=63. For illustration, entry E1 can have offsetted rank 62 based on TF-IDF score, and also 62 based on sentence-based semantic search. Then, the sum of reciprocal ranks provides the composite score $SC = 1/63 + 1/62 + 1/62 = 0.048131$. Thus, more high ranks (e.g. smaller numerically; 1 being the highest rank) can lead to greater composite score SC, and the offset (in this case 60) can prevent one or a few high ranks from dominating the composite score. Offsets from 1 to 1,000 can be used.

In further examples, a score SK or SS can be a vector. Thus, each keyword Y of requirement C can be scored independently against entries {E}, or each text fragment X of requirement C can be scored independently against entries {E}. Combined scores SK, SS can be calculated independently for each keyword Y or text fragment X over multiple keyword search procedures 1414 or semantic search procedures 1424 respectively. A set coverage problem can be solved to find an optimal set of entries {E}" collectively providing coverage of the set of keywords {Y} or the set of text fragments {X}.

Second Example Requirement Mapping Method

Figure 16:
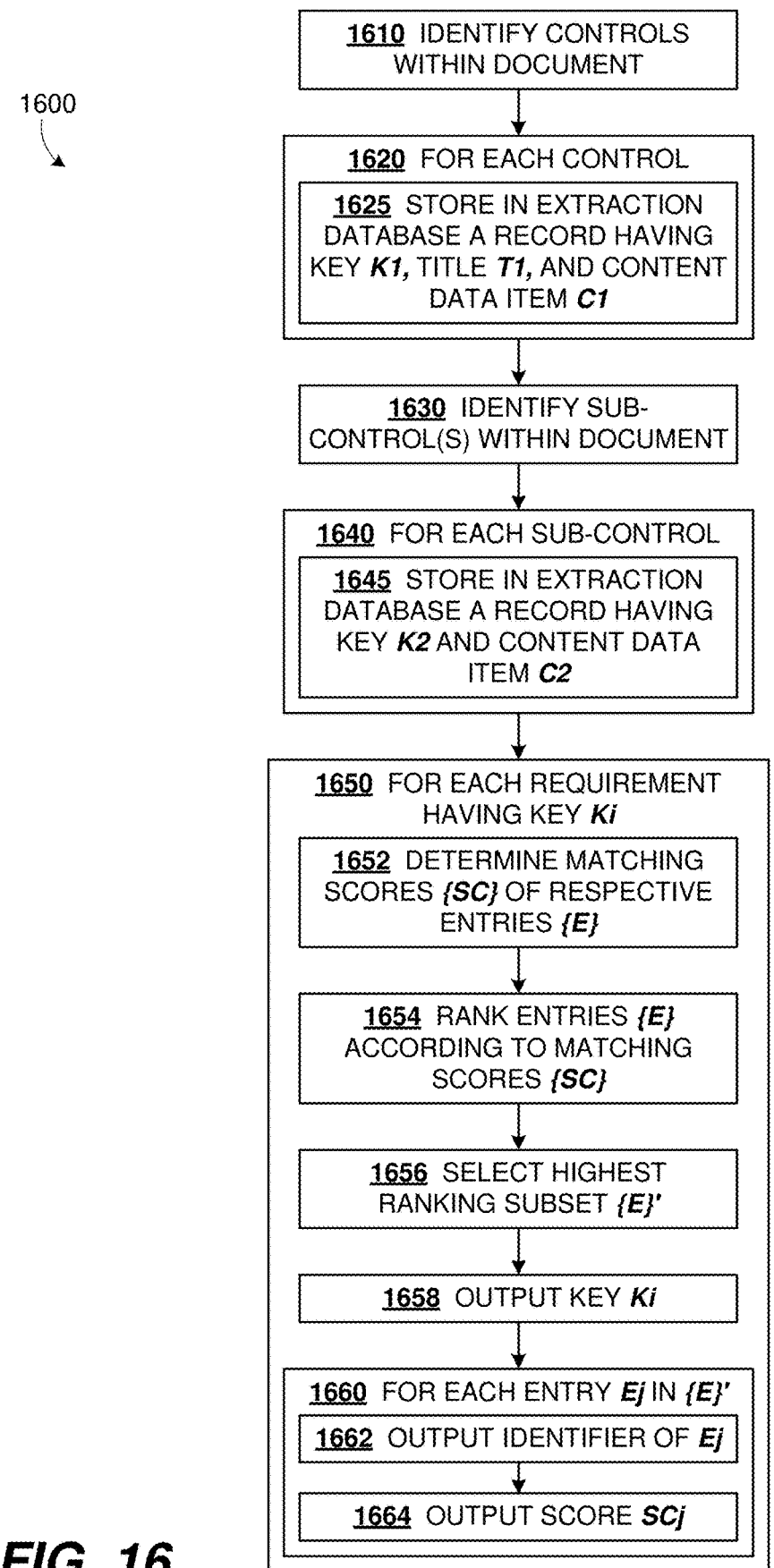
FIG. 16 is a flowchart illustrating a second example method for requirement mapping according to the disclosed technologies.

FIG. 16 is a flowchart 1600 illustrating a second example method for requirement mapping following identification of controls and sub-controls. In this method, controls and sub-controls are extracted from a document and mapped to entries of an implementation database.

At process block 1610, controls within a document can be identified. In some examples, controls can be extracted by associating the regulation with a schema (similar to 182 of FIG. 1) and applying a formula stored in the schema to the regulation. In other examples, a method similar to that described in context of FIG. 4 can be used. Then, process block 1620 can be iterated over the identified controls. For each control, a respective record (132, or 210 of FIG. 2) can be stored in an extraction database (130) at block 1625. The record can contain, in respective fields (212, 214, 216), a key, a title, and a content data item for the control.

At process block 1630, one or more sub-controls within the document can be identified. In some examples, sub-controls can be extracted using program code from a schema (182) while, in other examples, a method similar to that described in context of FIG. 8 can be used. Then, process block 1640 can be iterated over the identified sub-controls. For each sub-control, a respective record (132, 240) can be stored in an extraction database (130) at block 1645. The record can contain, in respective fields (232, 236), a key and a content data item for the sub-control.

Compound block 1650 describes operations performed for each of a plurality of the identified requirements having respective keys Ki. These requirements can be all or a subset of the requirements identified at block 1610, 1630.

At block 1652, matching scores {SC} can be determined for respective entries {E} in a target database (150). In some examples, techniques similar to those described in context of FIG. 14 can be used, but this is not mandatory. At block 1654, entries {E} can be ranked according to matching scores {SC} and, at block 1656, a subset of entries {E}'={E} having the highest ranks can be selected. At block 1658, the instant requirement's key Ki can be outputted (similar to keys in column 1511 of FIG. 15). Then, block 1660 can be iterated for entries Ej of {E}'. At block 1662, identifier Ej can be outputted (column 1513 or 1514), and at block 1664 the matching score can be outputted (column 1515). Blocks 1652-1660 can be repeated for other requirements.

Numerous variations and extensions can be implemented within scope of the disclosed technologies, some of which are described above, in the context of FIG. 14, or elsewhere herein.

In some examples, block 1652 can be performed by calculating a first score SK between a given entry E and the instant requirement, using one or more keyword search procedures, and calculating a second score SS between the given entry E and the instant requirement, using one or more semantic search procedures. The matching score SC of the entry E can be calculated based on the scores SK, SS. In some examples, reciprocal rank fusion can be used, as described herein. Other techniques described in context of block 1430 of FIG. 14 can also be used.

Example Coverage Analysis Method

Figure 17:
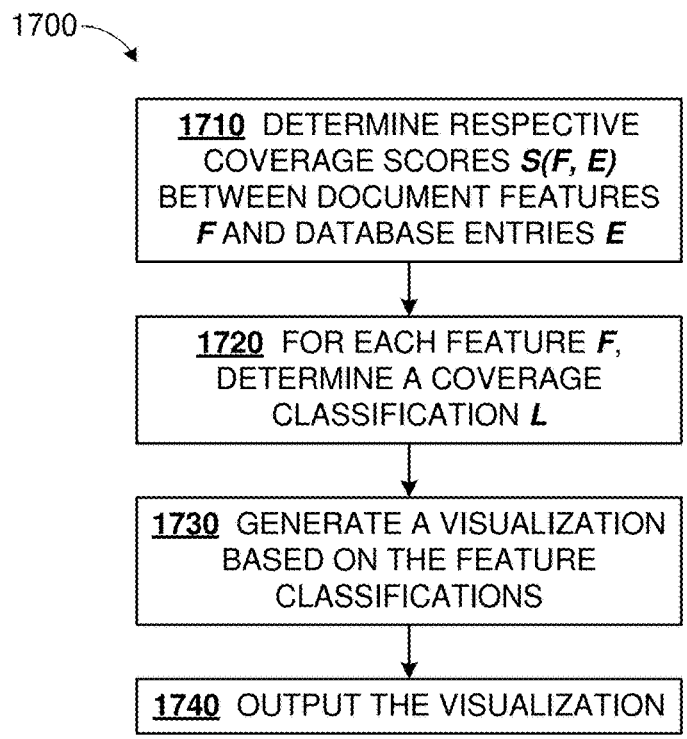
FIG. 17 is a flowchart of an example coverage analysis method according to the disclosed technologies.

FIG. 17 is a flowchart 1700 of an example coverage analysis method. In this method, document features are classified based on coverage in a database. A visualization is generated and outputted. In some examples, the document features can be controls, sub-controls, or semantic tokens of requirements of a regulation, but this is not a requirement. The technique of FIG. 17 can also be applied in fields outside regulatory compliance. To illustrate, a document feature can be e.g. a sentence or other chunk of a manuscript that was generated from a database or was decomposed into records of a database.

Figure 18:
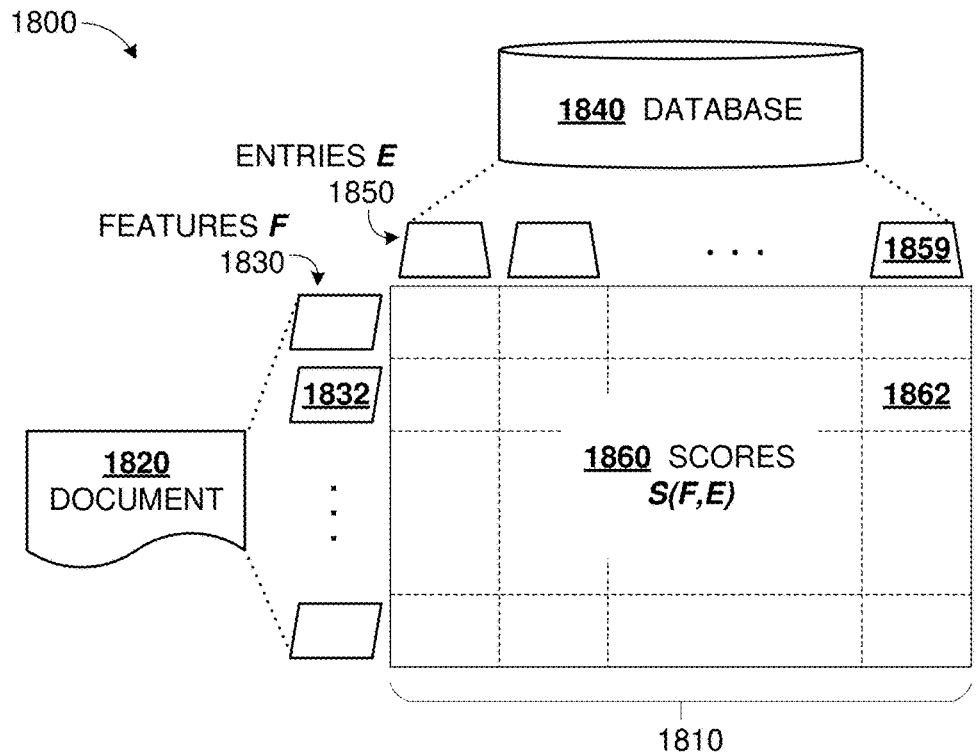
FIG. 18 is a diagram illustrating coverage scores according to examples of the disclosed technologies.

At process block 1710, respective coverage scores S(F,E) can be determined between features F of a document and entries E of a database. FIG. 18 is a diagram 1800 illustrating coverage scores. For illustrative purposes, scores 1860 are shown organized in table 1810. Features 1830 of document 1820 are shown organized along the left side of table 1810, each feature 1832 having a respective row in table 1810. Entries 1850 of database 1840 are shown organized along the top of table 1810, each entry 1859 having a respective column in table 1810. The coverage score S(F,E) of a given feature F 1832 and entry E 1859 can be stored at the table location 1862 whose row is indexed by feature 1832 and whose column is indexed by entry 1859. Scores 1860 for other pairs (F, E) can be similarly stored at other locations of table 1810. Computation of scores 1860 is described further herein, e.g. in context of FIG. 14.

At block 1720, a respective coverage classification L can be determined for each feature F. At block 1730, a visualization can be generated based on the feature classifications, and at block 1740 the visualization can be outputted. The classification L can be stored to a requirement record, e.g. at fields 226, 246 of records 210, 240; and links to visualization, or other coverage analysis described herein, can be stored at fields 228, 248.

Figure 19:
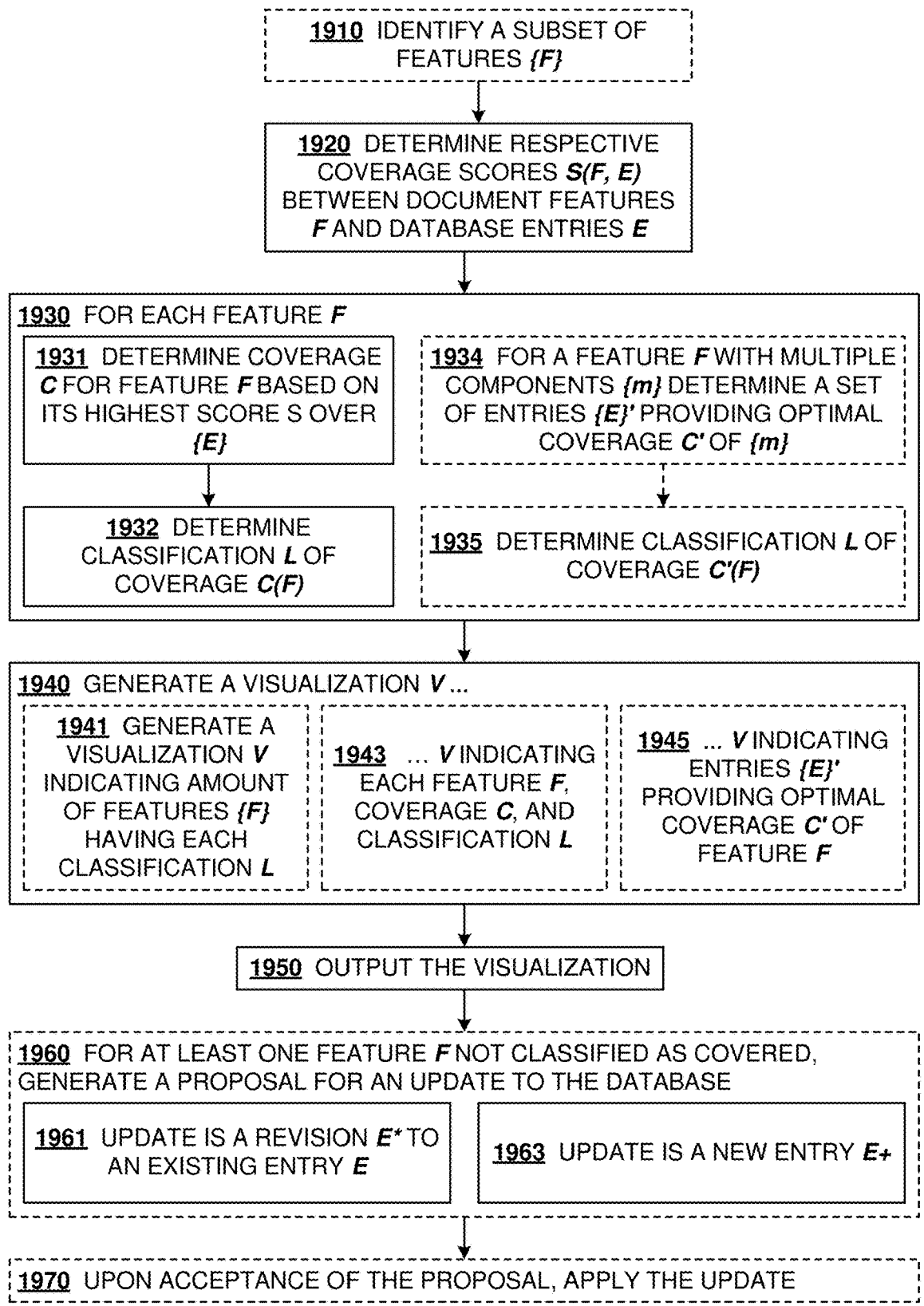
FIG. 19 is a flowchart illustrating variations and extensions of the method of FIG. 17, according the disclosed technologies.

Numerous variations and extensions of FIG. 17 can be implemented within scope of the disclosed technologies. FIG. 19 is a flowchart 1900 illustrating some of these variations or extensions, and FIG. 20 shows some example output 2001-2003.

Similar to block 1710, respective coverage scores S(F,E) between features F and entries E can be determined at process block 1920. In some examples, the features can include all features of document 1820 while, in other examples, a subset of the features can be identified at optional block 1910, prior to block 1920. To illustrate, a selection of the features can be received on a graphical user interface (e.g. from a client similar to 102). Alternatively, the identified subset can include all features which are new or have additional content relative to an earlier version of document 1820.

As an illustration, for features having respective keys (such as requirements), the following operations can be performed prior to block 1710 for each feature of the newer document version. A search of the earlier version can be made for a feature having the same key as the instant feature. If the search is unsuccessful, the instant feature can be classified as new, e.g. as a delta classification similar to 222 or 242, which can be stored accordingly in record 210 or 240. The new instant feature can be included in the features 1830 tested at block 1710. If the search returns a prior feature having the same key, the contents of the instant feature and the prior feature can be compared. If the contents also match, then the instant feature can be classified as unchanged, and this feature can be omitted from the features tested at block 1710. Otherwise, the instant feature can be classified as changed, and the comparison of contents (e.g. in the form of a red-line comparison (1202)) can be analyzed to determine whether any new material has been added in the instant feature. If yes, then the instant feature has additional content over the prior feature, and the instant feature can be included in the features 1830 tested at block 1710. If no, then the instant feature has only content deletion or rearrangement over the prior feature, and the instant feature can be included or omitted at block 1710 in varying embodiments.

Similar to block 1720, at block 1930 a coverage classification L can be determined for each feature F. In some examples, at block 1931, a coverage C for feature F can be determined based on feature F's highest coverage score over all entries {E} 1850. As a first illustration, if feature F has coverage scores S of 40%, 90%, 85%, then its coverage C can be set to the highest of these, namely 90%. At block 1932, classification L can be determined based on coverage C. In other examples, in which features can have multiple components, classification can be determined by following blocks 1934, 1935. At block 1934, a subset of entries {E}' can be identified which provides optimal coverage of components {m} of feature F. Subset {E}' can be determined as a solution to a set covering problem on the scores S(F,E), with each score S being a vector over components {m}. As a second illustration, if feature F has 3 components, of which component 1 is 100% covered by entry E1 and component 2 is 100% covered by entry E2, and component 3 is not covered at all by any entry, then the set {E1, E2} provides optimal coverage, namely 100% of components 1 and 2, but 0% of component 3. The overall coverage can be calculated as C'=(2×100%+1×0%)/(2+1)=66.7%. At block 1935, the classification L of feature F can be determined based on C'. It can be seen that applying block 1931 to the second illustration, each entry E1, E2 would only cover one of the three components of feature F, corresponding to 33.3% coverage, and coverage C would be only 33.3%. The fine-grained analysis of blocks 1934-1935 can result in higher coverage scores than blocks 1931-1932.

In some examples, the coverage classifications can include 3 classes A, B, C having progressively less coverage. Class B can correspond to coverage scores greater than a first threshold and below a second threshold. The second threshold can be 100%, meaning that a class A feature has a coverage score of 100% with respect to entries {E} 1850.

Similar to block 1730, a visualization V can be generated at block 1940. In some examples, following block 1943, visualization V can list each feature 1830 together with one or both of: its coverage classification or its highest coverage score. FIG. 20B provides an illustration with records 2021-2023 outputted for respective features, and the fields for these records organized according to column labels 2020. The features are identified in column 2011 (e.g. "AC-21"), highest coverage score is provided in column 2012 (e.g. 28%), and the coverage classification (e.g. Weakly Covered) is outputted in column 2013. As illustrated, feature 2021 can be a control identified by its key AC-21, feature 2022 can be a sub-control identified by its parent control "AC-21," a delimiter "#", and an index number "01." Feature 2023 can be a text fragment of a requirement, identified by its text.

In other examples, following block 1941, visualization V can list an aggregate measure of the features having each classification L. To illustrate, FIG. 20A shows three classes "Covered," "Mostly Covered," and "Weakly Covered" applicable to 82%, 12%, and 6% of the features respectively. Other aggregate measures can be used.

In further examples, following block 1945, visualization V can list the entries {E} determined at block 1934 as providing optimal coverage C' of feature F. FIG. 20C provides an illustration for a feature having key "AC-1" as identified by indicia 2031. Outputted table 2032 shows entries E1, E2 providing 60%, 40% coverage respectively, and 90% coverage overall. That is, 10% of feature AC-1 can be covered by both E1 and E2, and another 10% is not covered by E1, E2, or any other of the entries {E} tested at block 1934. A classification "Mostly Covered" 2033 determined at block 1935 can also be outputted.

Similar to block 1740, visualization V can be outputted at block 1950.

In some examples, the method can be extended at block 1960. For at least one feature F not classified as covered (and therefore representing a gap between a regulation and the implementation database), a proposal can be generated for an update to the database (150) that can remedy the gap. At block 1961, a proposed revision E* to an existing entry E can be generated, which can be suitable where a previous version of feature F was covered by entry E. Alternatively, at block 1963, a proposed new entry E+ can be generated, which can be suitable where F is a new feature not present in an earlier version of the regulation. The proposal can be received from a trained ML tool (ML5 165) in response to inputting feature F and, optionally, coverage scores S(F,E), highest scoring entry E (block 1931), or optimal covering set {E} (block 1934).

The proposal can be outputted to client (102) for approval. At block 1970, upon acceptance of the proposal, the update can be applied to the implementation database (150).

Still further, the methods of FIGS. 17, 19 can be applied to features extracted from a document using control extraction techniques described herein. A regexp pattern can be applied to identify keys of the features; content and optionally titles following the features can also be identified; records (210, 240) for each feature can be written to an auxiliary database containing the key (212, 232), the content (or, a locator to the content, 216, 236), and optionally the title (214, 234). In this way the features can be made available for the methods of FIGS. 17, 19. The document can be a regulation (112) and the database can be an implementation database (150) desired to conform to the regulation.

In some examples, the trained ML tool (165) used at block 1960 can be an off-the-shelf LLM capable of text generation. In other examples, a base LLM can be fine-tuned to adapt to terminology or language variations between a regulation and entries of an implementation database (150), and adapt generated updated proposals to match terminology, language, or style of the implementation database. Inasmuch as off-the-shelf LLMs can be used for one or more of ML1-ML5, these can be a same tool or distinct tools, in any combination.

Example Database Management Tool

Figure 21:
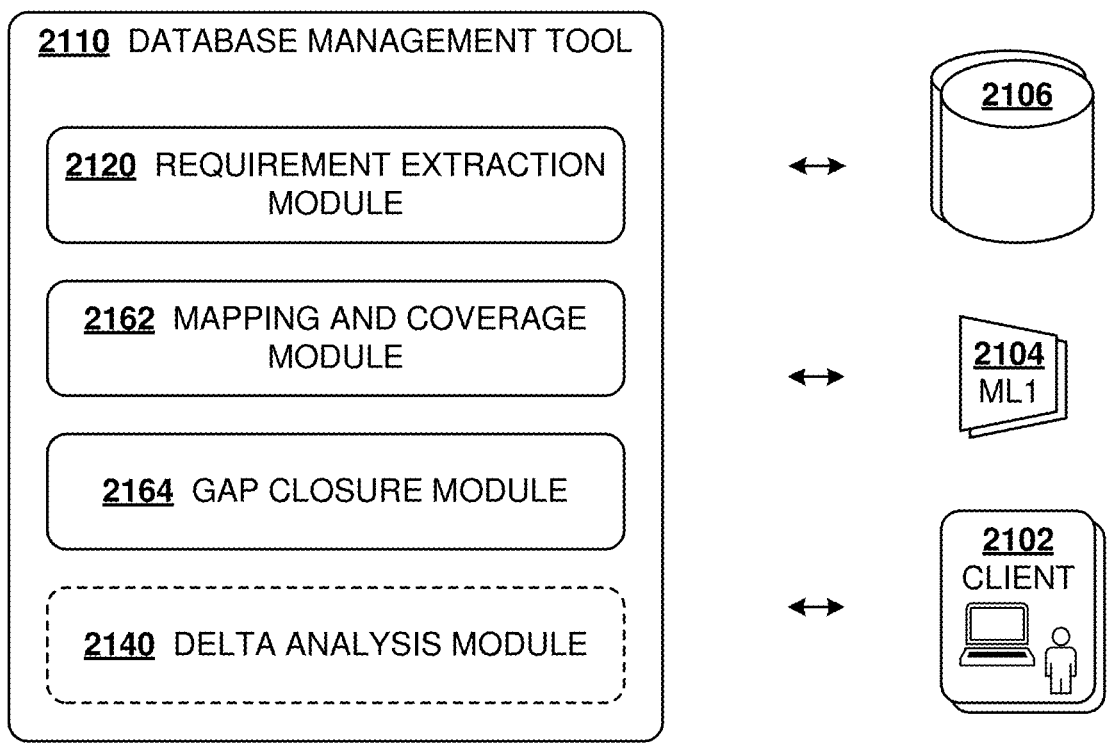
FIG. 21 is a diagram of a software tool implementing examples of the disclosed technologies.

FIG. 21 is a diagram 2100 of a database management tool implementing examples of the disclosed technologies. This tool implements software modules addressing various tasks discussed above. The illustrated modules can incorporate executable instructions, which can be stored on and accessed from computer-readable media, which in turn can be coupled to one or more hardware processors with memory, to form a computing system.

As shown, tool 2110 can be coupled to one or more client stations 2102, trained ML tools 2104, or databases 2106 as described elsewhere herein. For clarity of illustration, entities 2102, 2104, 2106 are shown distinct from tool 2100, however some deployments of the disclosed technologies can incorporate some or all of entities 2102 (e.g. a client interface), 2104, or 2106 within tool 2110, in any combination.

Requirement extraction module 2120 can be similar to module 120 of FIG. 1 or 525 of FIG. 5. Processor(s) executing first instructions of module 2120 can identify a plurality of requirements within a document (112), and output respective records (132, 210, 240) for each identified requirement to an extraction database (130), each record containing at least a key (212, 232) and a content data item (216, 236).

Numerous variations and extensions of module 2120 can be implemented within scope of the disclosed technologies, some of which are described in context of FIG. 4-9, or elsewhere herein.

Mapping and coverage module 2162 can combine certain functions of modules 162, 164. Processor(s) executing second instructions of module 2162 can iterate over a plurality of requirements, e.g. among those identified by module 2120. For each requirement, the processor(s) can select, according to a predetermined criterion, one or more entries of an implementation database providing coverage of the respective requirement, and output respective record(s) identifying each selected entry and a respective coverage score. The processor(s) can also classify the respective requirement according to the coverage score(s).

Numerous variations and extensions of module 2162 can be implemented within scope of the disclosed technologies, some of which are described in context of FIG. 14-20, or elsewhere herein.

Gap closure module 2164 can implement remaining functions of module 164. Processor(s) executing third instructions of module 2164 can operate on a requirement not classified as covered by module 2162, hence having a coverage gap. The processor(s) can determine a proposed update to the implementation database (150) and can prompt client 2102 for approval of the proposed update. Upon receiving approval, the processor(s) can implement the proposed update.

Numerous variations and extensions of module 2164 can be implemented within scope of the disclosed technologies, some of which are described in context of FIG. 19, or elsewhere herein.

Also shown in FIG. 21 is optional delta analysis module 2140, which can be similar to module 140. Processor(s) executing third instructions of module 2140 can operate on new requirements of a new document version and old requirements of an earlier document version. The processor(s) can compare the new requirements with corresponding old requirements, and can classify the new requirements based on a result of the comparison. A summary of the classifications can be outputted. The classifications can also be stored, and can be used to guide other modules. For example, certain processing blocks can be skipped for requirements which are unchanged, to achieve better computing efficiency.

Numerous variations and extensions of module 2140 can be implemented within scope of the disclosed technologies, some of which are described in context of FIG. 10-13, or elsewhere herein.

Database management tool 2110 can operate on documents which are regulations (112), and can manage an associated implementation database (150).

Additional Tasks

The disclosed technologies can be applied to additional tasks beyond (A)-(E) discussed above.

(F) Match requirements to entries in implementation database 150, e.g. to find redundant entries 152. The process used to form map requirements 132 to entries 152, forming records 172 in mapping database 170, can also create, update, or maintain records 174 that map entries to requirements. Then, entries 152 can be identified which do not map to any requirements 132, or only map to requirements 132 of obsolete regulations 112, and these entries can be flagged as obsolete or purged from database 170. Removal of obsolete entries can improve storage efficiency and can also improve computing efficiency as purged entries can be omitted from subsequent scans over entries.

(G) Find entries which are mapped to multiple requirements or regulations. These entries can be directly identified from records 174. In some examples, an entry mapped to a single requirement or regulation can selected for update by revision 1961, while for an entry mapped to multiple requirements or regulations, update by new entry can be proposed at block 1963.

(H) Does mapping agree with a previous mapping? Prior to adoption of disclosed technologies, mapping database 170 can have "old" entries e.g. generated manually, which can be prone to error. Thus, comparison of records 172, generating using the disclosed technologies, can be compared with the old entries. Discrepancies can be flagged for further review.

(I) Harmonizing database updates. Disclosed technologies can identify requirements having gaps in coverage. Similar gaps can be identified for multiple regulations. Thus, a given entry can have different gaps relative to respective requirements or regulations. For a given entry 152, a single update can be proposed at block 1960 that addresses multiple gaps.

(J) Harmonizing database updates. Disclosed technologies can identify requirements having no or weak coverage. Similar uncovered requirements can be identified for multiple regulations. Based on identifying semantic similarity between multiple such uncovered requirements, a single new entry can be proposed at block 1960 that provides coverage for multiple uncovered requirements, providing storage efficiency over having multiple redundant entries.

(K) Find redundant database entries. Delta analysis techniques disclosed for comparing requirements can also be applied to pairs of entries, allowing duplicate entries to be identified. The duplicate entries can be purged or flagged for review.

Additional Examples

The following are additional examples of the disclosed technologies.

Example A1 is a computer-implemented method, including: (a) providing a regulation, in augmented form, to a first trained machine-learning tool; (b) receiving, from the first trained machine-learning tool, a plurality of candidate control keys extracted from the regulation; (c) providing the plurality of candidate control keys to a client; (d) receiving, from the client, approval of at least a predetermined number of the candidate control keys; (e) providing the approved candidate control keys to a second trained machine-learning tool; (f) receiving, from the second trained machine-learning tool, a formula which distinguishes control keys within the regulation; (g) identifying, according to the formula, a plurality of control keys from the regulation; and, for each of the identified control keys: (h) outputting a respective record comprising the respective control key.

Example A2 includes the subject matter of Example A1, and further includes: prior to act (a), receiving a request from the client to extract controls from the regulation; wherein, at act (h), the respective record is outputted to the client.

Example A3 includes the subject matter of any of Examples A1-A2, and further includes: based on the control keys identified at act (g), identifying a plurality of candidate pairs, each pair having a respective one of the identified control keys and a respective candidate control title; providing the plurality of candidate pairs to the client; receiving, from the client, approval of at least a second predetermined number of the candidate pairs; and based on augmentation of the approved candidate pairs, identifying respective control titles for others of the identified control keys; wherein the respective record includes a first field storing the respective control key and a second field comprising the respective control title.

Example A4 includes the subject matter of Example A3, and further specifies that the respective candidate control title is identified: from a table of contents in the regulation; or using the first trained machine learning tool.

Example A5 includes the subject matter of any of Examples A3-A4, and further includes, for each of the identified control keys: determining a content endpoint based on one or more content termination criteria; and identifying, as respective content, material following the respective control title in the regulation up to the content endpoint; wherein the respective record includes a third field comprising the respective content or a locator for the respective content.

Example A6 includes the subject matter of Example A5, and further specifies that the content termination criteria comprise one or more of: a subsequent control key; a predetermined discontinuity in text augmentation; or an end of the regulation.

Example A7 includes the subject matter of any of Examples A1-A6, and further specifies that the regulation in augmented form comprises a table of contents, and the method further comprises: generating the table of contents.

Example A8 includes the subject matter of any of Examples A1-A7, and further specifies that act (d) further comprises: receiving, from the client, rejection of one or more of the candidate control keys.

Example A9 includes the subject matter of any of Examples A1-A8, and further includes, subsequent to operation (g): reporting, to the client: at least some of the identified control keys; and any of the candidate control keys rejected by the formula; prompting the client to make a selection; receiving the selection from the client; and responsive to the selection indicating a retry, repeating operations (d) through (g).

Example A10 includes the subject matter of any of Examples A1-A9, and further includes identifying sub-controls of one or more of the identified control keys.

Example A11 includes the subject matter of any of Examples A1-A10, and further includes: (j) for a given one of the identified control keys, obtaining a client's approval of a split comprising one or more candidate sub-controls; (k) executing a program corresponding to the approved split to identify sub-controls over a plurality of controls of the regulation, each sub-control having a respective sub-control key; and, for each of the identified sub-controls: (l) outputting a respective sub-control record comprising the respective sub-control key.

Example A12 includes the subject matter of Example A11, and further includes: prior to act (j): identifying one or more features in content associated with the given control key; identifying the one or more candidate sub-controls based on the feature(s); and generating the split based according to the candidate sub-controls; and subsequent to act (j) and prior to act (k): providing the split to a third trained machine-learning tool; and receiving the program from the third trained machine-learning tool.

Example A13 includes the subject matter of any of Examples A11-A12, and further includes, prior to act (j): selecting one among a library of programs; executing the selected program on content associated with the given control key to obtain the split; and prompting the client for the approval; wherein the program executed at act (k) is the selected program.

Example A14 includes the subject matter of any of Examples A11-A13, and further includes, for each of the identified sub-controls: determining a content endpoint based on one or more content termination criteria; and identifying, as respective content, material following the respective sub-control key in the regulation up to the content endpoint; wherein the respective sub-control record comprises a first field storing the respective sub-control key and a second field storing the respective content or a locator for the respective content.

Example A21 includes the subject matter of Example A14, and further specifies that the content termination criteria comprise one or more of: a subsequent sub-control key; or an end of the given control key's content.

Example A15 is one or more computer-readable media storing instructions which, when executed on one or more hardware processors, cause the one or more hardware processors to perform operations comprising: for a given requirement of a regulation, the given requirement having corresponding content: condensing the content to obtain a plurality of keywords; extracting a plurality of text fragments from the content; and computing respective first vector embeddings of each of the text fragments; for each entry, having respective content, of a plurality of entries of an implementation database: computing, using one or more keyword search procedures, corresponding one or more first scores between (i) the plurality of keywords and (ii) the respective content; computing, using one or more semantic search procedures, corresponding one or more second scores between (iii) the plurality of text fragments and (iv) the respective content; and combining the one or more first scores and the one or more second scores to obtain a composite score; ranking the entries according to their respective composite scores; selecting a highest-ranking subset of the ranked entries; outputting a key of the given requirement; and outputting, for each entry in the highest-ranking subset, an identifier of the entry and the respective composite score.

Example A16 includes the subject matter of Example A15, and further specifies that the combining operation for the respective entry comprises: for each of the one or more keyword search procedures: calculating a first offsetted rank of the corresponding first score of the respective entry, among the first scores of the plurality of entries; and, for each of the one or more semantic search procedures: calculating a second offsetted rank of the corresponding second score of the respective entry, among the second scores of the plurality of entries; and summing reciprocals of the one or more first offsetted ranks and reciprocals of the one or more second offsetted ranks to obtain the composite score of the respective entry.

Example A17 includes the subject matter of any of Examples A15-A16, and further specifies that one of the one or more keyword search procedures returns a Jaccard similarity measure.

Example A18 includes the subject matter of any of Examples A15-A17, and further specifies that at least one of the one or more semantic search procedures operates on text fragments which are sentences.

Example A19 is a system, including: one or more hardware processors, with memory coupled thereto; computer-readable media storing program instructions executable by the one or more hardware processors, the program instructions comprising: first instructions which, when executed, cause the one or more hardware processors to: (a) identify a plurality of requirements within a document; and (b) for each of the identified requirements, store, in an extraction database, a respective first record comprising a key and a content data item; second instructions which, when executed, cause the one or more hardware processors to: for each of a plurality of the identified requirements: (c) select, according to a predetermined criterion, one or more entries of an implementation database providing coverage of the respective identified requirement; (d) output respective record(s) identifying each selected entry and a respective coverage score; and (e) classify the respective identified requirement according to its respective coverage score; and third instructions which, when executed, cause the one or more hardware processors to: for a given one of the identified requirements identified not classified as covered: (g) determine a proposed update to the implementation database; (h) prompt a client for approval of the proposed update; and (i) upon receiving the approval, implement the proposed update.

Example A20 includes the system of Example A19, and further specifies that the program instructions further comprise: fourth instructions which, when executed, cause the one or more hardware processors to: (j) compare a plurality of new requirements in a new version of the document with corresponding old requirements in an earlier version of the document; (k) determine classifications of the new requirements based on a result of the comparing; and (l) store the classifications.

Example B1 is a computer-implemented method, including: receiving a selection of a regulation having first and second versions; obtaining first and second directories of requirement records of the first and second versions respectively, each requirement record comprising respective data items for key and/or title, and for content; and for each of a group of the requirement records in the first directory, having respective first keys or first titles: obtaining respective first content of the first version; identifying a second requirement record in the second directory having a matching second key or a matching second title; obtaining second content of the second version from the second requirement record; comparing the first content and the second content; calculating one or more measures of content change based on the comparing; and generating and outputting a visualization showing the first key or first title, and the one or more measures.

Example B2 includes the subject matter of Example B1, and further includes, for a given first requirement record of the group: based on the comparing, generating a red-line version of the first content and the second content; and outputting the red-line version.

Example B3 includes the subject matter of Example B2, and further includes: providing the first content and the second content to a fourth trained machine-learning tool; receiving, from the fourth trained machine-learning tool, a summary of changes between the first content and the second content; and outputting the summary for the given first requirement record.

Example B4 includes the subject matter of any of Examples B1-B3, and further includes: retrieving second classifications of each of the requirement records in the second directory as new, updated, or unchanged over a third version of the regulation; determining first classifications of each of the requirement records in the first directory as new, updated, or unchanged over the second version, wherein the updated and the unchanged classifications are based on the comparing; generating aggregated statistics correlating the first classifications and the second classifications; and outputting the aggregated statistics.

Example B5 is one or more computer-readable media storing instructions which, when executed on one or more hardware processors, cause the one or more hardware processors to perform operations for mapping a document to a target database, wherein the document comprises a plurality of requirements including: controls; and sub-controls of respective controls; and wherein the operations comprise: (a) identifying a plurality of the controls within the document; (b) for each of the identified controls, storing, in an extraction database, a respective first record comprising: a first key, a title, and a first content data item; (c) identifying one or more of the sub-controls; (d) for each of the identified sub-controls, storing, in the extraction database, a respective second record comprising: a second key and a second content data item; and for each of a plurality of the requirements having a respective key among the first keys and the second keys: (e) determining matching scores of respective entries in the target database; (f) ranking the entries according to the matching scores; (g) selecting a highest-ranking subset of the entries; (h) outputting the respective key; and (i) outputting, for each entry in the highest-ranking subset, an identifier of the entry and the respective matching score.

Example B6 includes the subject matter of Example B5, and further specifies that operation (e) comprises: calculating a first score between content of the respective requirement and a given one of the entries using a keyword search procedure; calculating a second score between the content of the respective requirement and the given entry using a semantic search procedure; and calculating the matching score of the given entry based on the first score and the second score.

Example B7 is a system, including: one or more hardware processors, with memory coupled thereto; and computer-readable media storing instructions which, when executed by the one or more hardware processors, causes the one or more hardware processors to perform operations comprising: (a) determining respective coverage scores between features of a document and entries of a database; and for each of the features: (b) determining a classification of a coverage of the respective feature; and (c) generating and outputting a visualization based on the classifications of the features.

Example B8 includes the subject matter of Example B7, and specifies that the operations further include: based on the coverage scores, identifying those features which are not covered by the entries; and outputting data of the identified features.

Example B9 includes the subject matter of any of Examples B7-B8, and further specifies that the features encompass all identified features of the document.

Example B10 includes the subject matter of any of Examples B7-B9, and further specifies that the operations further comprise, prior to operation (a): receiving, on a graphical user interface, a selection of the features.

Example B11 includes the subject matter of any of Examples B7-B10, and further specifies that the document is a second version, and the features of operation (a) encompass all features of the second version which are new or augmented from an earlier first version of the document.

Example B21 includes the subject matter of Example B11, and specifies that the operations further include, prior to operation (a): for each second feature of the second version, having a respective second key: searching for a first feature of the first version having a first key matching the second key; if the search is unsuccessful, identifying the second feature as new; and if the search is successful: comparing content of the second feature with content of the first feature; if the contents match, identifying the second feature as unchanged; and if the contents differ, identifying the second feature as updated; wherein the augmented features are included among features marked as updated.

Example B12 includes the subject matter of any of Examples B7-B11 or B21, and further specifies that the classification is selected from a group comprising: a first class, indicating that the coverage is greater than or equal to a first threshold; a second class, indicating that the coverage is less than the first threshold and greater than or equal to a second threshold; and a third class, indicating that the coverage is less than the second threshold.

Example B13 includes the subject matter of Example B12, and further specifies that the first threshold is 100%.

Example B14 includes the subject matter of any of Examples B7-B13 or B21, and further specifies that the visualization individually lists each of the features and its highest coverage score.

Example B15 includes the subject matter of any of Examples B7-B14 or B21, and further specifies that the classifications of the features are selected from a set of available classifications, and the visualization provides, for each classification in the set, an aggregate measure of the features assigned that classification.

Example B16 includes the subject matter of any of Examples B7-B15 or B21, and further specifies that the operations further comprise, for at least one feature not classified as covered: generating and outputting a proposal for an update to the database to provide coverage for the at least one feature.

Example B22 includes the subject matter of Example B16, and further specifies that the update is a new entry to be added to the database.

Example B23 includes the subject matter of any of Examples B16 or B22, and further specifies that the update is a revision of an existing entry in the database.

Example B17 includes the subject matter of any of Examples B16 or B22-B23, and further specifies that the operations further comprise: receiving, on a graphical user interface, approval of the proposal; and implementing the update to the database.

Example B18 includes the subject matter of any of Examples B16-B17 or B22-B23, and further specifies that the generating comprises: providing the at least one feature to a fifth trained machine-learning tool; and receiving the proposal from the fifth trained machine-learning tool.

Example B19 includes the subject matter of any of Examples B7-B17 or B21-B23, and further includes, prior to operation (a), extracting at least some of the features by: applying a regular expression pattern to identify keys of the features; identifying text following the keys as respective titles of the features; identifying respective content of the features following the respective titles; and writing records to an auxiliary database, each record comprising: the key, the title, and a content data item of a respective feature.

Example B20 includes the subject matter of any of Examples B7-19 or B21-B23, and further specifies that the document is a regulation and the database is an implementation database.

A Generalized Computer Environment

Figure 22:
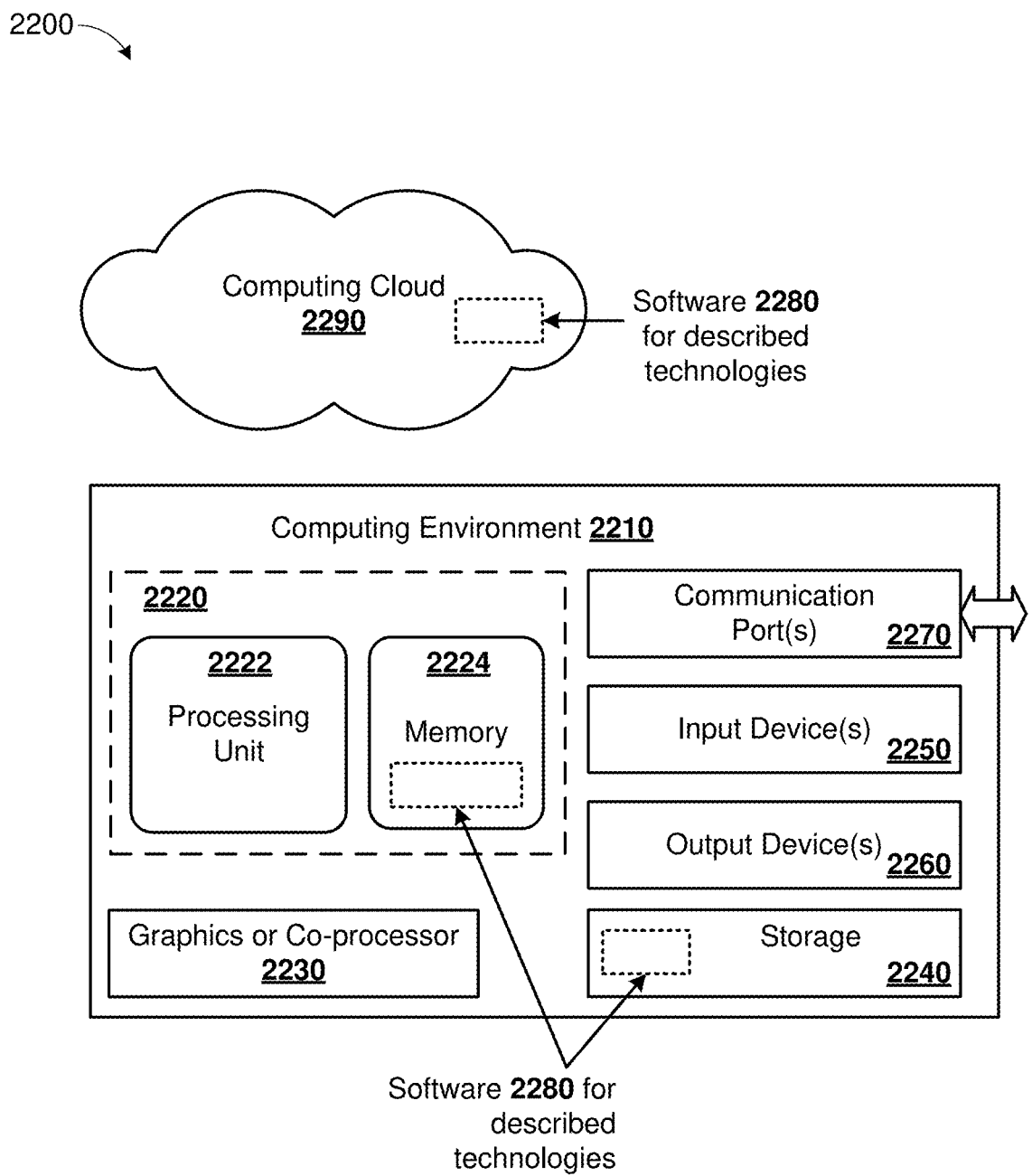
FIG. 22 is a diagram schematically depicting a computing environment suitable for implementation of disclosed technologies.

FIG. 22 illustrates a generalized example of a suitable computing system 2200 in which described examples, techniques, technologies, and workflows related to database management, with controlling documents, can be implemented according to disclosed technologies. The computing system 2200 is not intended to suggest any limitation as to scope of use or functionality of the present disclosure, as the innovations can be implemented in diverse general-purpose or special-purpose computing systems.

With reference to FIG. 22, computing environment 2210 includes one or more processing units 2222 and memory 2224. In FIG. 22, this basic configuration 2220 is included within a dashed line. Processing unit 2222 executes computer-executable instructions, such as for implementing any of the methods or objects described herein for techniques or workflows related to database management with controlling datasets, including control extraction, sub-control extraction, delta analysis, correlation, requirement mapping, coverage analysis, gap analysis, or various other architectures, software components, handlers, managers, modules, or services described herein. Processing unit 2222 can be a general-purpose central processing unit (CPU), a processor in an application-specific integrated circuit (ASIC), or any other type of processor. In a multi-processing system, multiple processing units execute computer-executable instructions to increase processing power. Computing environment 2210 can also include a graphics processing unit or co-processing unit 2230. Tangible memory 2224 can be volatile memory (e.g., registers, cache, or RAM), non-volatile memory (e.g., ROM, EEPROM, or flash memory), or some combination thereof, accessible by processing units 2222, 2230. The memory 2224 stores software 2280 implementing one or more innovations described herein, in the form of computer-executable instructions suitable for execution by the processing unit(s) 2222, 2230. The memory 2224 can also store records of requirements or entries, regulations, schemas, or mappings, summaries; parameters of trained machine-learning tools, other configuration data, data structures including data tables, working tables, change logs, output structures, data values, indices, or flags, as well as other operational data.

A computing system 2210 can have additional features, such as one or more of storage 2240, input devices 2250, output devices 2260, or communication ports 2270. An interconnection mechanism (not shown) such as a bus, controller, or network interconnects the hardware components of the computing environment 2210. Typically, operating system software (not shown) provides an operating environment for other software executing in the computing environment 2210, and coordinates activities of the hardware and software components of the computing environment 2210.

The tangible storage 2240 can be removable or non-removable, and can include magnetic disks, magnetic tapes or cassettes, CD-ROMs, DVDs, or any other medium which can be used to store information in a non-transitory way and which can be accessed within the computing environment 2210. The storage 2240 stores instructions of the software 2280 (including instructions and/or data) implementing one or more innovations described herein.

The input device(s) 2250 can be a mechanical, touch-sensing, or proximity-sensing input device such as a keyboard, mouse, pen, touchscreen, trackball, a voice input device, a scanning device, or another device that provides input to the computing environment 2210. The output device(s) 2260 can be a display, printer, speaker, optical disk writer, or another device that provides output from the computing environment 2210.

The communication port(s) 2270 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 2200 can also include a computing cloud 2290 in which instructions implementing all or a portion of the disclosed technologies are executed. Any combination of memory 2224, storage 2240, and computing cloud 2290 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, software objects, classes, data structures, etc. that perform tasks or implement particular abstract data types. The functionality of the program modules can be combined or split between program modules as desired in various embodiments. Computer-executable instructions for program modules can be executed within a local or distributed computing system.

The terms "computing system," "computing environment," and "computing device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 23:
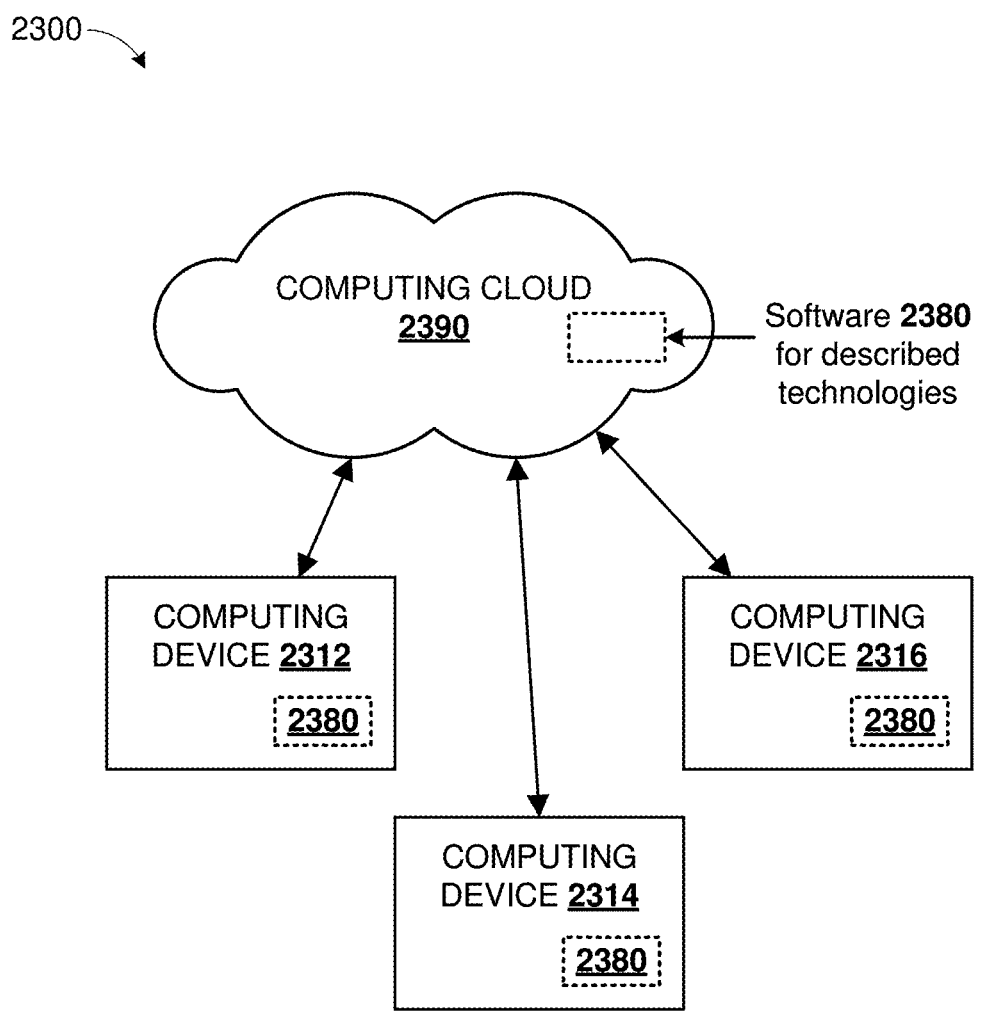
FIG. 23 is a diagram schematically depicting computing devices operating in conjunction with a computing cloud for implementation of disclosed technologies.

FIG. 23 depicts an example cloud computing environment 2300 in which the described technologies can be implemented. The cloud computing environment 2300 comprises a computing cloud 2390 containing resources and providing services. The computing cloud 2390 can comprise various types of cloud computing resources, such as computer servers, data storage repositories, networking resources, and so forth. The computing cloud 2390 can be centrally located (e.g., provided by a data center of a business or organization) or distributed (e.g., provided by various computing resources located at different locations, such as different data centers and/or located in different cities or countries).

The computing cloud 2390 can be operatively connected to various types of computing devices (e.g., client computing devices), such as computing devices 2312, 2314, and 2316, and can provide a range of computing services thereto. One or more of computing devices 2312, 2314, and 2316 can be computers (e.g., servers, virtual machines, embedded systems, desktop, or laptop computers), mobile devices (e.g., tablet computers, smartphones, or wearable appliances), or other types of computing devices. Communication links between computing cloud 2390 and computing devices 2312, 2314, and 2316 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 2312, 2314, and 2316 can also be connected to each other.

Computing devices 2312, 2314, and 2316 can utilize the computing cloud 2390 to obtain computing services and perform computing operations (e.g., data processing, data storage, and the like). Particularly, software 2380 for performing the described innovative technologies can be resident or executed in the computing cloud 2390, in computing devices 2312, 2314, and 2316, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and do not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "apply," "assign," "augment," "calculate," "classify," "combine," "compare," "compute," "condense," "determine," "display," "evaluate," "execute," "filter," "find," "generate," "identify," "implement," "modify," "obtain," "optimize," "output," "perform," "prompt," "provide," "query," "rank," "read," "receive," "report," "request," "respond," "return," "retrieve," "search," "select," "send," "sort," "store," "sum," "transmit," "update," "use," or "write," to indicate computer operations in a computer system. These terms denote actual operations that are performed or controlled by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

In some examples, values, procedures, or apparatus may be referred to as "optimal," "lowest," "best," "maximum," "extremum," or the like. It will be appreciated that such descriptions are intended to indicate that a selection among a few or among many alternatives can be made, and such selections need not be lower, better, less, or otherwise preferable to other alternatives not considered.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 22, computer-readable storage media include memory 2224, and storage 2240. The terms computer-readable media or computer-readable storage media do not include signals and carrier waves. In addition, the terms computer-readable media or computer-readable storage media do not include communication ports (e.g., 2270) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C#, Curl, Dart, Fortran, Go, Java, JavaScript, *Julia*, Lisp, Matlab, Octave, Perl, Python, R, Ruby, Rust, SAS, SPSS, WebAssembly, any derivatives thereof, or any other suitable programming language, or, in some examples, markup languages such as HTML or XML, or in any combination of suitable languages, libraries, and packages. Likewise, the disclosed technologies are not limited to any particular computer or type of hardware. Certain details of suitable computer, hardware, and communication technologies are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed technologies may be applied, it should be recognized that the illustrated embodiments are only preferred examples and should not be taken as limiting the scope of the claims. Rather, the scope of the claimed subject matter is defined by the following claims. We therefore claim all that comes within the scope and spirit of these claims.

We claim:

1. A computer-implemented method, comprising:
   (a) providing a regulation, in augmented form, to a first trained machine-learning tool;
   (b) receiving, from the first trained machine-learning tool, a plurality of candidate control keys extracted from the regulation;
   (c) providing the plurality of candidate control keys to a client;
   (d) receiving, from the client, approval of at least a predetermined number of the candidate control keys;
   (e) providing the approved candidate control keys to a second trained machine-learning tool;
   (f) receiving, from the second trained machine-learning tool, a formula which distinguishes control keys within the regulation;
   (g) identifying, according to the formula, a plurality of control keys from the regulation; and
   for each of the identified control keys:
   (h) outputting a respective record comprising the respective control key.

2. The computer-implemented method of claim 1, further comprising:
   prior to act (a), receiving a request from the client to extract controls from the regulation;
   wherein, at act (h), the respective record is outputted to the client.

3. The computer-implemented method of claim 1, further comprising:

based on the control keys identified at act (g), identifying a plurality of candidate pairs, each pair having a respective one of the identified control keys and a respective candidate control title;

providing the plurality of candidate pairs to the client;

receiving, from the client, approval of at least a second predetermined number of the candidate pairs; and based on augmentation of the approved candidate pairs, identifying respective control titles for others of the identified control keys;

wherein the respective record includes a first field storing the respective control key and a second field comprising the respective control title.

4. The computer-implemented method of claim 3, wherein the respective candidate control title is identified:
from a table of contents in the regulation; or
using the first trained machine learning tool.

5. The computer-implemented method of claim 3, further comprising, for each of the identified control keys:
determining a content endpoint based on one or more content termination criteria; and
identifying, as respective content, material following the respective control title in the regulation up to the content endpoint;
wherein the respective record includes a third field comprising the respective content or a locator for the respective content.

6. The computer-implemented method of claim 5, wherein the content termination criteria comprise one or more of:
a subsequent control key;
a predetermined discontinuity in text augmentation; or
an end of the regulation.

7. The computer-implemented method of claim 1, wherein the regulation in augmented form comprises a table of contents, and the method further comprises:
generating the table of contents.

8. The computer-implemented method of claim 1, wherein act (d) further comprises:
receiving, from the client, rejection of one or more of the candidate control keys.

9. The computer-implemented method of claim 1, further comprising, subsequent to operation (g):
reporting, to the client:
at least some of the identified control keys; and
any of the candidate control keys rejected by the formula;
prompting the client to make a selection;
receiving the selection from the client; and
responsive to the selection indicating a retry, repeating operations (d) through (g).

10. The computer-implemented method of claim 1, further comprising, identifying sub-controls of one or more of the identified control keys.

11. The computer-implemented method of claim 1, further comprising:
(j) for a given one of the identified control keys, obtaining a client's approval of a split comprising one or more candidate sub-controls;
(k) executing a program corresponding to the approved split to identify sub-controls over a plurality of controls of the regulation, each sub-control having a respective sub-control key; and
for each of the identified sub-controls:
(l) outputting a respective sub-control record comprising the respective sub-control key.

12. The computer-implemented method of claim 11, further comprising:
prior to act (j):
identifying one or more features in content associated with the given control key;
identifying the one or more candidate sub-controls based on the feature(s); and
generating the split based according to the candidate sub-controls; and
subsequent to act (j) and prior to act (k):
providing the split to a third trained machine-learning tool; and
receiving the program from the third trained machine-learning tool.

13. The computer-implemented method of claim 11, further comprising, prior to act (j):
selecting one among a library of programs;
executing the selected program on content associated with the given control key to obtain the split; and
prompting the client for the approval;
wherein the program executed at act (k) is the selected program.

14. The computer-implemented method of claim 11, further comprising, for each of the identified sub-controls:
determining a content endpoint based on one or more content termination criteria; and
identifying, as respective content, material following the respective sub-control key in the regulation up to the content endpoint;
wherein the respective sub-control record comprises a first field storing the respective sub-control key and a second field storing the respective content or a locator for the respective content.

15. One or more computer-readable media storing instructions which, when executed on one or more hardware processors, cause the one or more hardware processors to perform operations comprising:
for a given requirement of a regulation, the given requirement having corresponding content:
condensing the content to obtain a plurality of keywords;
extracting a plurality of text fragments from the content; and
computing respective first vector embeddings of each of the text fragments;
for each entry, having respective content, of a plurality of entries of an implementation database:
computing, using one or more keyword search procedures, corresponding one or more first scores between (i) the plurality of keywords and (ii) the respective content;
computing, using one or more semantic search procedures, corresponding one or more second scores between (iii) the plurality of text fragments and (iv) the respective content; and
combining the one or more first scores and the one or more second scores to obtain a composite score;
ranking the entries according to their respective composite scores;
selecting a highest-ranking subset of the ranked entries;
outputting a key of the given requirement; and
outputting, for each entry in the highest-ranking subset, an identifier of the entry and the respective composite score.

16. The one or more computer-readable media of claim 15, wherein the combining operation for the respective entry comprises:

for each of the one or more keyword search procedures:
calculating a first offsetted rank of the corresponding first score of the respective entry, among the first scores of the plurality of entries; and
for each of the one or more semantic search procedures:
calculating a second offsetted rank of the corresponding second score of the respective entry, among the second scores of the plurality of entries; and
summing reciprocals of the one or more first offsetted ranks and reciprocals of the one or more second offsetted ranks to obtain the composite score of the respective entry.

17. The one or more computer-readable media of claim 15, wherein one of the one or more keyword search procedures returns a Jaccard similarity measure.

18. The one or more computer-readable media of claim 15, wherein at least one of the one or more semantic search procedures operates on text fragments which are sentences.

19. A system, comprising:
one or more hardware processors, with memory coupled thereto;
computer-readable media storing program instructions executable by the one or more hardware processors, the program instructions comprising:
first instructions which, when executed, cause the one or more hardware processors to:
(a) identify a plurality of requirements within a document; and
(b) for each of the identified requirements, store, in an extraction database, a respective first record comprising a key and a content data item;
second instructions which, when executed, cause the one or more hardware processors to:
for each of a plurality of the identified requirements:
(c) select, according to a predetermined criterion, one or more entries of an implementation database providing coverage of the respective identified requirement;
(d) output respective record(s) identifying each selected entry and a respective coverage score; and
(e) classify the respective identified requirement according to its respective coverage score; and
third instructions which, when executed, cause the one or more hardware processors to:
for a given one of the identified requirements identified not classified as covered:
(g) determine a proposed update to the implementation database;
(h) prompt a client for approval of the proposed update; and
(i) upon receiving the approval, implement the proposed update.

20. The system of claim 19, wherein the program instructions further comprise:
fourth instructions which, when executed, cause the one or more hardware processors to:
(j) compare a plurality of new requirements in a new version of the document with corresponding old requirements in an earlier version of the document;
(k) determine classifications of the new requirements based on a result of the comparing; and
(l) store the classifications.

* * * * *